(12) United States Patent
Nagata et al.

(10) Patent No.: US 10,637,124 B2
(45) Date of Patent: Apr. 28, 2020

(54) WINDOW GLASS

(71) Applicant: NIPPON SHEET GLASS COMPANY, LIMITED, Tokyo (JP)

(72) Inventors: Hideshi Nagata, Tokyo (JP); Takahiro Asai, Tokyo (JP); Ryuichi Tashiro, Tokyo (JP); Hiromasa Morishita, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/344,647

(22) PCT Filed: Oct. 19, 2017

(86) PCT No.: PCT/JP2017/037887
§ 371 (c)(1),
(2) Date: Apr. 24, 2019

(87) PCT Pub. No.: WO2018/079415
PCT Pub. Date: May 3, 2018

(65) Prior Publication Data
US 2020/0052366 A1  Feb. 13, 2020

(30) Foreign Application Priority Data

Oct. 25, 2016 (JP) ................. 2016-209109

(51) Int. Cl.
*H04M 1/00* (2006.01)
*H01Q 1/12* (2006.01)
(Continued)

(52) U.S. Cl.
CPC .......... *H01Q 1/1271* (2013.01); *B60R 11/02* (2013.01); *H04B 15/02* (2013.01); *B60J 1/02* (2013.01);
(Continued)

(58) Field of Classification Search
CPC ....... H01Q 1/1271; B60R 11/02; B60R 11/04; B60R 2011/0026; H04B 15/02; B60J 1/02
(Continued)

(56) References Cited

U.S. PATENT DOCUMENTS 5,083,134 A * 1/1992 Saitou .................. H01Q 1/1271
343/704
5,719,585 A * 2/1998 Tabata ................. H01Q 1/1271
343/713
(Continued)

FOREIGN PATENT DOCUMENTS

| JP | 2000-174529 A | 6/2000 |
| JP | 2004-260504 A | 9/2004 |

(Continued)

OTHER PUBLICATIONS

International Search Report, issued in PCT/JP2017/037887, PCT/ISA/210, dated Jan. 9, 2018.
(Continued)

*Primary Examiner* — Sonny Trinh
(74) *Attorney, Agent, or Firm* — Birch, Stewart, Kolasch & Birch, LLP

(57) ABSTRACT

The present invention provides a window glass near which an electronic device is disposed, the window glass including a glass plate, an antenna disposed on the glass plate, an electronic device that is disposed near the glass plate, and at least one linear canceller that is disposed on the glass plate and is configured to inhibit noise produced from the electronic device from being received by the antenna.

18 Claims, 32 Drawing Sheets

(51) Int. Cl.
  *H04B 15/02* (2006.01)
  *B60R 11/02* (2006.01)
  *B60J 1/02* (2006.01)
  *B60R 11/00* (2006.01)
  *B60R 11/04* (2006.01)

(52) U.S. Cl.
  CPC ....... *B60R 11/04* (2013.01); *B60R 2011/0026* (2013.01)

(58) Field of Classification Search
  USPC ........................ 455/63.1, 67.13, 575.7, 114.2
  See application file for complete search history.

(56) References Cited

U.S. PATENT DOCUMENTS

| | | | | |
|---|---|---|---|---|
| 9,509,038 | B2* | 11/2016 | Kagaya | H01Q 1/1285 |
| 9,755,300 | B2* | 9/2017 | Kagaya | H01Q 1/1285 |
| 10,181,636 | B2* | 1/2019 | Funatsu | H01Q 9/42 |
| 10,211,509 | B2* | 2/2019 | Kagaya | H01Q 9/30 |
| 2012/0256798 | A1 | 10/2012 | Paulus et al. | |
| 2016/0118708 | A1* | 4/2016 | Suenaga | H01Q 9/26 343/713 |
| 2016/0134013 | A1* | 5/2016 | Suenaga | H01Q 1/1271 343/711 |
| 2016/0294037 | A1* | 10/2016 | Ochi | H01Q 1/1271 |
| 2016/0344088 | A1* | 11/2016 | Takeuchi | H01Q 1/1271 |

FOREIGN PATENT DOCUMENTS

| | | |
|---|---|---|
| JP | 2013-515387 A | 5/2013 |
| JP | 2015-95794 A | 5/2015 |
| WO | WO 2012/133754 A1 | 10/2012 |
| WO | WO 2015/019904 A1 | 2/2015 |

OTHER PUBLICATIONS

Written Opinion of the International Searching Authority, issued in PCT/JP2017/037887, PCT/ISA/237, dated Jan. 9, 2018.

* cited by examiner (a)

(b)

(c)

(d)

(e)

(f)

(g)

(h)

WINDOW GLASS

TECHNICAL FIELD

The present invention relates to a window glass.

BACKGROUND ART

In recent years, various electronic devices such as an antenna for receiving broadcast waves and a sensor for measuring an inter-vehicular distance have been arranged on a windshield of an automobile. However, there is a problem that the performance of receiving broadcast waves deteriorates due to noise transmitted from electronic devices. To address this, for example, in Patent Literature 1, a conductive pattern having an opening is formed on a windshield, and a sensor is disposed in this opening, and thereby noise from the sensor is inhibited from being received by an antenna.

CITATION LIST

Patent Literature

Patent Literature 1: JP 2015-95794λ

SUMMARY OF INVENTION

Technical Problem

However, a conductive pattern as described above is problematic in that lead wires are formed in the form of a grid and an opening in which a sensor is to be disposed needs to be formed as described above, and thus the shape is complicated. Also, such a problem may occur in a window glass on which not only a sensor but also general electronic devices that may produce noise are arranged. The present invention was made to solve this problem and an object thereof is to provide a window glass capable of reducing noise received by an antenna from an electronic device using a simple configuration.

Solution to Problem

A window glass according to the present invention has the following aspects.

Aspect 1. A window glass near which an electronic device is to be disposed, the window glass including a glass plate, an antenna that is disposed on the glass plate, an electronic device that is disposed near the glass plate, and at least one linear canceller that is disposed on the glass plate and is configured to inhibit noise produced from the electronic device from being received by the antenna.

Aspect 2. The window glass according to Aspect 1, in which the canceller is disposed between the antenna and the electronic device.

Note that "between the antenna and the electronic device" refers to "at least half of the length of the linear canceller being disposed in a region formed by a line connecting an upper portion of the antenna and an upper portion of the electronic device and a line connecting a lower portion of the antenna and a lower portion of the electronic device", for example.

Aspect 3. The window glass according to Aspect 2, in which, in a case where broadcast waves received by the antenna have a wavelength of $\lambda_1$ to $\lambda_2$ and the glass plate has a wavelength shortening ratio of $\alpha$, a distance between the antenna and the canceller is $0.08*\alpha*\lambda_2$ or more, and a distance between the electronic device and the canceller is $0.08*\alpha*\lambda_2$ or more.

Aspect 4. The window glass according to Aspect 2, in which, in a case where broadcast waves received by the antenna have a center wavelength of $\lambda c$ and the glass plate has a wavelength shortening ratio of $\alpha$, a distance between the antenna and the canceller is $(0.3\pm0.05)*\alpha*\lambda c$ or a distance between the electronic device and the canceller is $(0.3\pm0.05)*\alpha*\lambda c$.

Aspect 5. The window glass according to any of Aspects 2 to 4, in which the canceller is disposed closer to the electronic device than an intermediate position between the antenna and the electronic device.

Aspect 6. The window glass according to any of Aspects 1 to 5, in which, in a case where broadcast waves received by the antenna have a wavelength of $\lambda$, the canceller has a total length of $\lambda_2/2*\alpha*1.06$ or more.

Aspect 7. The window glass according to Aspect 6, in which the canceller has a total length of $\lambda_2/2*\alpha*1.16$ or more.

Aspect 8. The window glass according to Aspect 1, in which the canceller is disposed on the side of the electronic device opposite to the antenna.

Aspect 9. The window glass according to Aspect 8, in which, in a case where broadcast waves received by the antenna have a wavelength of $\lambda_1$ to $\lambda_2$ and the glass plate has a wavelength shortening ratio of $\alpha$, a distance between the electronic device and the canceller is $\lambda_1/4*\alpha$ or less.

Aspect 10. The window glass according to Aspect 8 or 9, in which, in a case where broadcast waves received by the antenna have a wavelength of $\lambda_1$ to $\lambda_2$ and the glass plate has a wavelength shortening ratio of $\alpha$, the canceller has a total length of $\lambda/2*0.8$ or less.

Aspect 11. The window glass according to any of Aspects 1 to 10, in which the canceller has a linear first site and a linear second site that is joined to at least one end portion of the first site and is bent from the first site.

Aspect 12. The window glass according to Aspect 11, in which the second site is bent toward the antenna.

Aspect 13. The window glass according to Aspect 11 or 12, in which, in a case where broadcast waves received by the antenna have a wavelength of $\lambda_1$ to $\lambda_2$ and the glass plate has a wavelength shortening ratio of $\alpha$, the first site has a length of $\lambda_2/2*\alpha$ or more.

Aspect 14. The window glass according to Aspect 11 or 13, in which the second site is bent at an angle of −135 degrees to 135 degrees with respect to the first site.

Aspect 15. The window glass according to any of Aspects 1 to 14, including a plurality of the cancellers.

Aspect 16. The window glass according to any of Aspects 1 to 15, in which the glass plate is formed using a laminated glass.

Aspect 17. The window glass according to any of Aspects 1 to 16, in which the antenna is a digital television antenna.

Aspect 18. The window glass according to any of Aspects 1 to 17, in which an angle at which a perpendicular line that extends perpendicularly to a line connecting a center of the antenna and a center of the electronic device on the glass plate intersects with the canceller is 15 degrees or less.

Advantageous Effects of Invention

The window glass according to the present invention makes it possible to reduce noise received by an antenna from an electronic device using a simple configuration.

DESCRIPTION OF EMBODIMENTS

Figure 1:
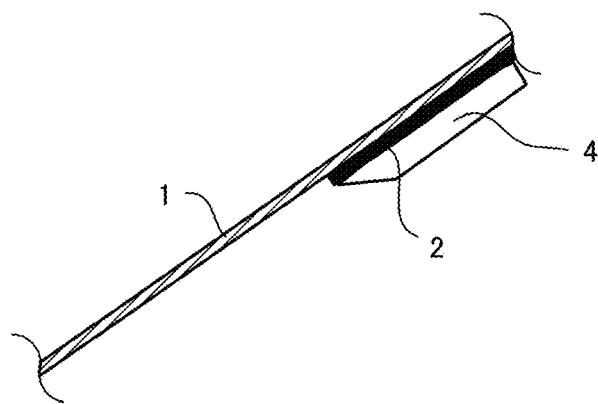
FIG. 1 is a cross-sectional view of an embodiment of a windshield according to the present invention.
Figure 2:
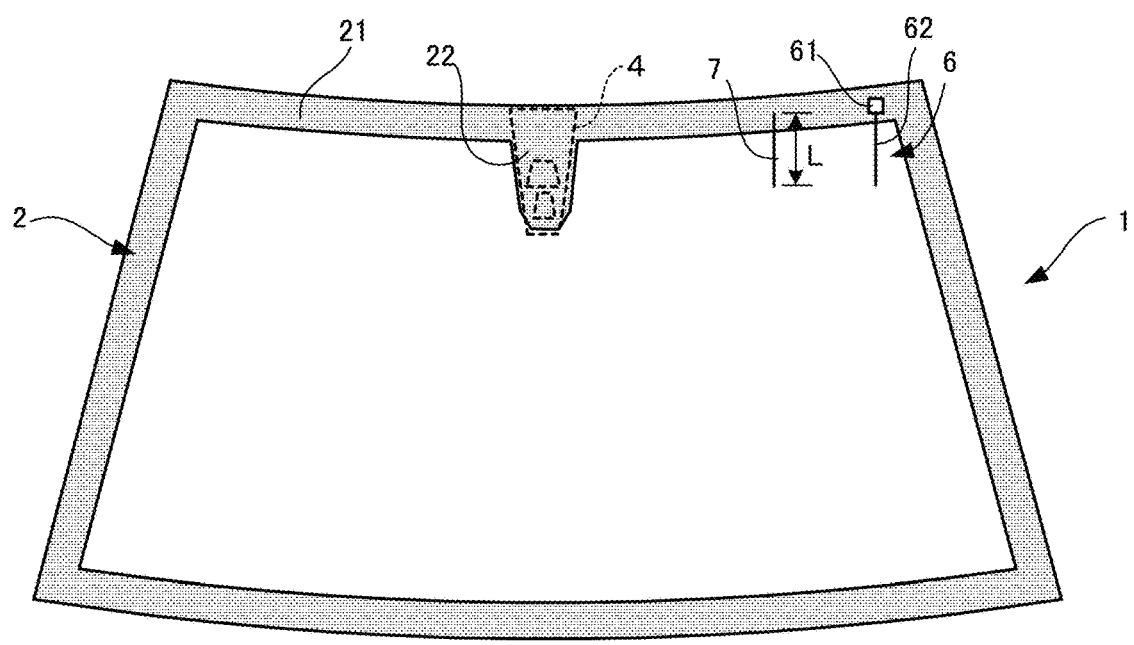
FIG. 2 is a plan view of FIG. 1.

Hereinafter, an embodiment in which the window glass according to the present invention is applied to a windshield will be described with reference to the drawings. FIG. 1 is a cross-sectional view of a windshield according to the present embodiment, and FIG. 2 is a plan view of FIG. 1. As shown in FIGS. 1 and 2, the windshield according to the present embodiment includes a glass plate 1 and a mask layer 2 stacked on this glass plate 1, and a measurement unit 4 (e.g., a laser radar) configured to measure an intervehicular distance is attached to the mask layer 2. Also, a digital television antenna 6 and a canceller 7 for reducing noise from the measurement unit 4 are arranged on the glass plate 1. Each member will be described below.

1. Overview of Glass Plate
1-1. Glass Plate

Figure 3:
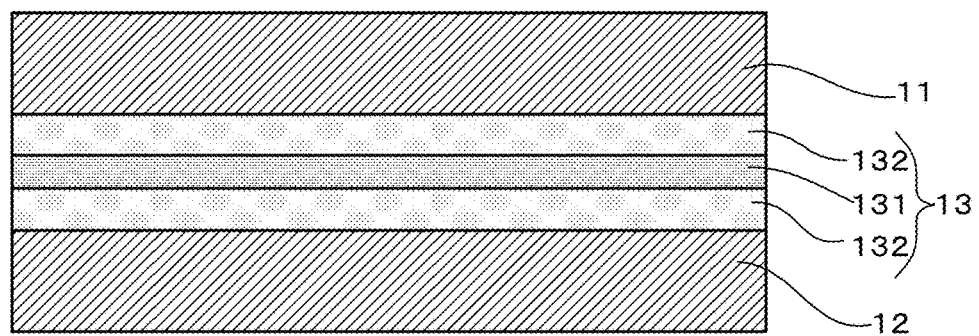
FIG. 3 is a cross-sectional view of a laminated glass.

The glass plate 1 may have various configurations, and may be constituted by laminated glass having a plurality of glass plates, or may be constituted by one glass plate, for example. If laminated glass is used, the glass plate 1 may be constituted as shown in FIG. 3, for example. FIG. 3 is a cross-sectional view of the laminated glass.

As shown in FIG. 3, this laminated glass includes an outer glass plate 11 and an inner glass plate 12, and an intermediate film 13 made of resin is disposed between these glass plates 11 and 12. First, the outer glass plate 11 and the inner glass plate 12 will be described. A known glass plate may be used as the outer glass plate 11 and the inner glass plate 12, and these glass plates 11 and 12 may also be formed using heat-ray absorbing glass, usual clear glass, green glass, or UV green glass. However, these glass plates 11 and 12 need to realize a visible light transmittance conforming to the safety standards of the country in which the automobile is used. For example, adjustment may be performed such that a required solar absorptivity is ensured by the outer glass plate 11 and the visible light transmittance satisfies the safety standards due to the inner glass plate 12. Hereinafter, one example of the composition of clear glass, one example of the composition of heat-ray absorbing glass, and one example of the composition of soda-lime based glass will be shown.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R represents an alkali metal)
Total iron oxide (T-$Fe_2O_3$) in terms of $Fe_2O_3$: 0.08 to 0.14 mass %

Heat-Ray Absorbing Glass

The composition of the heat-ray absorbing glass is based on the clear glass composition, and can be obtained by setting, for example, the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the backbone components (mainly, $SiO_2$ and $Al_2O_3$) of the glass by the amount of increase in T-$Fe_2O_3$, $CeO_2$, and $TiO_2$.

Soda-Lime Based Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) in terms of $Fe_2O_3$: 0.02 to 0.03 mass %

Although there is no particular limitation on the thickness of the laminated glass according to the present embodiment, from the viewpoint of reducing the weight, the total thickness of the outer glass plate 11 and the inner glass plate 12 is preferably 2.4 to 3.8 mm, more preferably 2.6 to 3.4 mm, and particularly preferably 2.7 to 3.2 mm. In this manner, in order to reduce the weight, it is necessary to reduce the total thickness of the outer glass plate 11 and the inner glass plate 12, and thus, although the thickness of each glass plate is not particularly limited, the thickness of the outer glass plate 11 and the inner glass plate 12 may be determined as will be described later, for example.

The outer glass plate 11 is mainly required to have durability and impact resistance against external interference, and if this laminated glass is used as a windshield of an automobile, for example, the outer glass plate 11 needs to have impact resistance against flying objects such as pebbles. On the other hand, the larger the thickness is, the heavier the weight is, and thus a thick outer glass plate is not preferable. From this point of view, the thickness of the outer glass plate 11 is preferably 1.8 to 2.3 mm, and more preferably 1.9 to 2.1 mm. Which thickness to adopt may be determined according to the use of the glass.

Although the thickness of the inner glass plate 12 may be equivalent to that of the outer glass plate 11, for example, from the viewpoint of reducing the weight of the laminated glass, the thickness of the inner glass plate 12 may be smaller than that of the outer glass plate 11. Specifically, considering the strength of the glass, the thickness of the inner glass plate 12 is preferably 0.6 to 2.0 mm, more preferably 0.8 to 1.6 mm, and particularly preferably 1.0 to 1.4 mm. Furthermore, the thickness of the inner glass plate 12 is preferably 0.8 to 1.3 mm. With regard to the inner glass plate 12, which thickness to adopt may also be determined according to the use of the glass.

Also, the outer glass plate 11 and the inner glass plate 12 according to the present embodiment each have a curved shape.

Herein, one example of a method for measuring the thickness of a curved glass plate will be described. First, with regard to measurement positions, two measurement positions, namely an upper measurement position and a lower measurement position, are located on a centerline extending in the up-down direction at the center of the glass plate in the left-right direction. Although there is no particular limitation on a measurement device, a thickness gauge such as SM-112 manufactured by TECLOCK Corporation may be used, for example. At the time of measurement, the glass plate is disposed such that a curved surface of the glass plate is placed on a flat surface, and the thickness of the glass plate is measured with an end portion of the glass plate held using the above-described thickness gauge. Note that even in the case where the glass plate is flat, measurement can be performed in a manner similar to that used in the case where the glass plate is curved.

Also, as a result of actual measurement, the physical values of the outer glass plate 11 and the inner glass plate 12 as described above are as follows. Also, although the details will be described later, about 0.7, which is the value of a wavelength shortening ratio α used in later-described working examples, was calculated using simulation.

TABLE 1

| Frequency (Hz) | Relative Permittivity | Dissipation Factor |
| --- | --- | --- |
| 1M | 7.03 | 0.006 |
| 100M | 7.03 | 0.006 |
| 200M | 7 | 0.006 |
| 1000M | 6.94 | 0.009 |
| 2000M | 6.86 | 0.01 |

1-2. Intermediate Film

Next, the intermediate film 13 will be described. The intermediate film 13 is formed using at least one layer, and as one example, as shown in FIG. 3, the intermediate film 13 may be constituted by three layers obtained by sandwiching a soft core layer 131 between outer layers 132 that are harder than the core layer 131. However, the configuration of the intermediate film 13 is not limited to this configuration, and it is sufficient that the intermediate film 13 is formed using a plurality of layers including the core layer 131 and at least one outer layer 132 disposed on the outer glass plate 11 side. For example, a bilayer intermediate film 13 including the core layer 131 and one outer layer 132 disposed on the outer glass plate 11 side, an intermediate film 13 in which the core layer 131 is disposed at the center and two or more outer layers 132, of which there is an even number, are disposed on each side of the core layer 131, or an intermediate film 13 in which an odd number of outer layers 132 are disposed on one side of the core layer 131 and an even number of outer layers 132 are disposed on the other side may also be adopted. Note that if only one outer layer 132 is provided, as described above, one outer layer 132 is provided on the outer glass plate 11 side, and the reason for this is to improve fracture tolerance against external forces exerted from the outside of the vehicle or the outdoors. Also, the higher the number of outer layers 132 is, the higher the sound insulation performance is.

There is no particular limitation on the hardness of the core layer 131 as long as the core layer 131 is softer than the outer layer 132.

Although there is no particular limitation on a material for forming the layers 131 and 132, these layers 131 and 132 may be made of a resin material, for example. Specifically, the outer layer 132 may be made of polyvinyl butyral resin (PVB). Polyvinyl butyral resin is preferable because it has excellent adhesiveness to each glass plate and penetration resistance. On the other hand, the core layer 131 may be made of ethylene vinyl acetate resin (EVA), or polyvinyl acetal resin, which is softer than the polyvinyl butyral resin for forming the outer layer 132. As a result of sandwiching the soft core layer 131 between the outer layers 132, it is possible to significantly improve sound insulation performance while maintaining adhesiveness and penetration resistance equivalent to those of a single resin intermediate film.

Also, the total thickness of the intermediate film 13 is not particularly limited, but the total thickness of the intermediate film 13 is preferably 0.3 to 6.0 mm, more preferably 0.5 to 4.0 mm, and particularly preferably 0.6 to 2.0 mm. Also, the thickness of the core layer 131 is preferably 0.1 to 2.0 mm, and more preferably 0.1 to 0.6 mm. On the other hand, the thickness of each outer layer 132 is preferably larger than the thickness of the core layer 131, and specifically, the thickness of the each outer layer 132 is preferably 0.1 to 2.0 mm, and more preferably 0.1 to 1.0 mm. In addition, it is also possible to adjust the thickness of the core layer 131 out of these layers with the total thickness of the intermediate film 13 kept constant.

The thickness of the core layer 131 and the outer layers 132 may be measured as described below, for example. First, the cross-section of laminated glass is displayed using a microscope (VH-5500 manufactured by KEYENCE CORPORATION, for example) at 175-fold magnification. Then, the thickness of the core layer 131 and the thicknesses of the outer layers 132 are specified by eyesight and measured. At this time, in order to eliminate variations caused by visual observation, the number of instances of measurement is set to five, and the averages thereof are respectively used as the thickness of the core layer 131 and the thicknesses of the outer layers 132. For example, enlarged photographs of laminated glass are taken, and the core layer and the outer layers 132 are specified in these photographs and their thicknesses are measured.

Note that the thicknesses of the core layer 131 and the outer layers 132 of the intermediate film 13 need not be constant over all of the surfaces, and the core layer 131 and the outer layers 132 may have a wedge shape for used in laminated glass that is to be used in a head up display, for example. In this case, the thicknesses of the core layer 131 and the outer layers 132 of the intermediate film 13 are measured at a position with the smallest thickness, that is, the thickness of the lowermost portion of the laminated glass is measured. If the intermediate film 3 has a wedge shape, the outer glass plate and the inner glass plate are not arranged parallel to each other, but such an arrangement is also encompassed in the glass plate according to the present invention. That is, the present invention includes an arrangement of the outer glass plate 11 and the inner glass plate 12 when using an intermediate film 13 obtained using a core layer 131 and an outer layer 132 whose thicknesses increase at a change ratio of 3 mm or less per millimeter, for example.

Although there is no particular limitation on the method for manufacturing the intermediate film 13, examples thereof include a method in which resin components such as the above-described polyvinyl acetal resin, a plasticizer, and other additives as required are mixed and kneaded evenly, and layers are then collectively subjected to extrusion molding, and a method of stacking these two or more resin films produced using the previous method through pressing, lamination, or the like. Resin films that have not been stacked and that are to be used in the method of stacking through pressing, lamination, or the like may have a single layer structure or multilayer structure. Also, the intermediate film 13 may be formed using one layer, instead of being formed using a plurality of layers as described above.

1-3. Infrared Transmittance of Glass Plate

As described above, the windshield according to the present embodiment is used in a frontward safety system of an automobile in which measurement units such as a laser radar and camera are used. In such a safety system, a vehicle located in front of the automobile is irradiated with infrared rays and the speed of the automobile located in front and an inter-vehicular distance are measured. Thus, laminated glass (or one glass plate) is required to achieve a predetermined range of infrared transmittance.

If a usual sensor is used as a laser radar, for example, laminated glass having an infrared transmittance of 20% or more and 80% or less, and preferably 20% or more and 60% or less with respect to light (infrared rays) having a wavelength of 850 to 950 nm is useful. A transmittance measurement method conforms with JIS R3106, and UV3100 (manufactured by Shimadzu Corporation) may be used as a measurement apparatus. Specifically, the transmittance of light in one direction that is emitted at an angle of 90 degrees with respect to the surface of the laminated glass is measured.

Also, the speed of the frontward vehicle and the inter-vehicular distance are measured using an infrared camera and not a laser radar in the safety system as described above, and in this case, if a usual camera is used as the laser radar, for example, a camera having an infrared transmittance of 30% or more and 80% or less, and preferably 40% or more and 60% or less with respect to light (infrared rays) having a wavelength of 700 to 800 nm is useful. The transmittance measurement method conforms with ISO9050.

2. Mask Layer

Next, the mask layer 2 will be described. The glass plate 1 according to the present embodiment is provided with the mask layer 2 as shown in FIG. 2. The mask layer 2 is stacked on the glass plate, and the position thereof is not particularly limited. For example, if the glass plate is formed using one glass plate, the mask layer 2 may be stacked on a surface of the glass plate on the vehicle interior side. On the other hand, if the glass plate is formed using laminated glass as shown in FIG. 3, the mask layer 2 may be stacked on at least one of a surface of the outer glass plate 11 on the vehicle interior side, a surface of the inner glass plate 12 on the outside of the vehicle, and a surface of the inner glass plate 12 on the vehicle interior side. It is preferable that, among these surfaces, for example, mask layers 2 having approximately the same shape are formed on both the surface of the outer glass plate 11 on the vehicle interior side and the surface of the inner glass plate 12 on the vehicle interior side because the curvatures of both glass plates 11 and 12 coincide with each other at the position at which the mask layers 2 are stacked.

Figure 4:
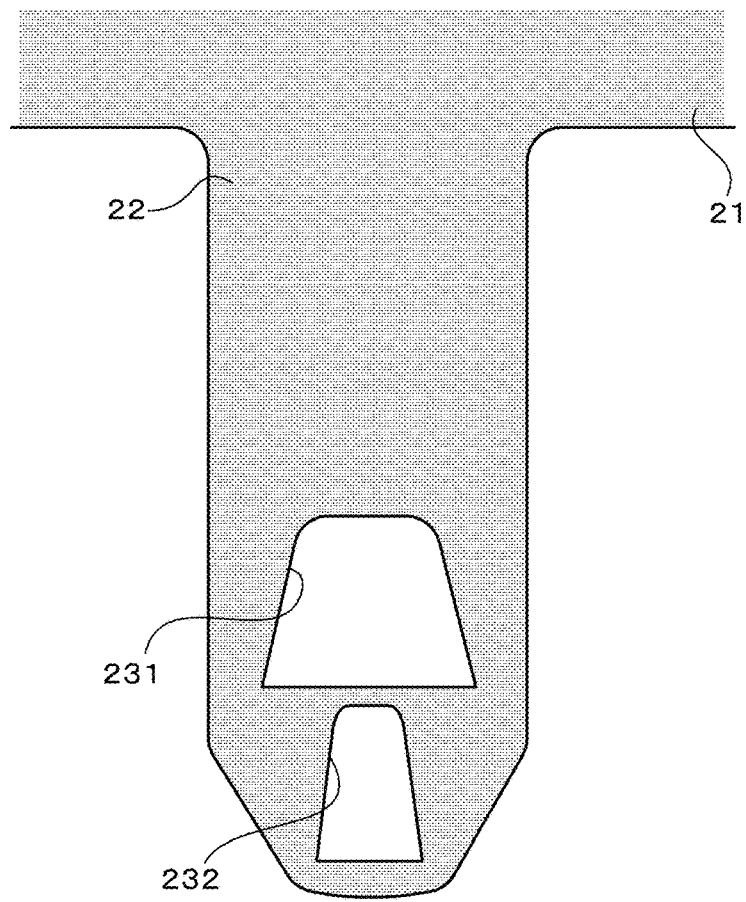
FIG. 4 is an enlarged plan view of a center mask layer.

This mask layer 2 is a dark-colored region for preventing the vehicle interior from being seen from the outside, an adhesive being applied to this region to attach the glass plate 1 to the vehicle body, for example, and the mask layer 2 includes a peripheral edge mask layer 21 formed at an outer peripheral edge of the glass plate 1 and a center mask layer 22 that extends downward from the center of this peripheral edge mask layer 21 at the upper edge of the glass plate 1. The above-described measurement unit 4 is attached to the center mask layer 22, and as shown in FIG. 4, the center mask layer 22 is provided with an upper opening 231 and a lower opening 232 through which light emitted from the sensor passes. As will be described later, it is sufficient that the measurement unit 4 is disposed such that light emitted from the sensor passes through the center of the lower opening and light reflected by a leading vehicle and an obstacle is received. Although these mask layers 2 may be made of various materials, there is no particular limitation thereon as long as the material is capable of shielding the field of view from the outside of the vehicle, and the mask layers 2 may be formed by applying ceramic of a dark color such as black to the glass plate 1, for example.

Ceramic may be formed using various materials, and may have the following composition, for example.

TABLE 2

First Table

|  |  | First and Second Colored Ceramic Paste |
| --- | --- | --- |
| Pigment *1 | mass % | 20 |
| Resin (cellulose resin) | mass % | 10 |
| Organic Solvent (pine oil) | mass % | 10 |
| Glass Binder *2 | mass % | 65 |
| Viscosity | dPs | 150 |

*1, main components: copper oxide, chromium oxide, iron oxide, and manganese oxide
*2, main components: bismuth borosilicate, zinc borosilicate Also, ceramic may be formed using a screen printing method, or, in addition to this method, may be produced by transferring a transfer film for firing a glass plate and firing the transfer film. As the conditions of screen printing, a 355 mesh polyester screen may be used, the coat thickness may be set to 20 μm, tension may be set to 20 Nm, the squeegee hardness may be set to 80, the attachment angle may be set to 75 degrees, and the printing speed may be set to 300 mm/s, for example, and it is possible to form a ceramic layer and a silver layer through drying in a drying furnace at 150° C. for 10 minutes. Note that if a first ceramic layer, a silver layer, and a second ceramic layer are to be stacked on each other in the stated order, it is sufficient to repeat the screen printing and drying described above.

Note that the mask layer 2 may also be formed by attaching a resin sheet, in addition to being formed using ceramic as described above.

3. Measurement Unit

Figure 5:
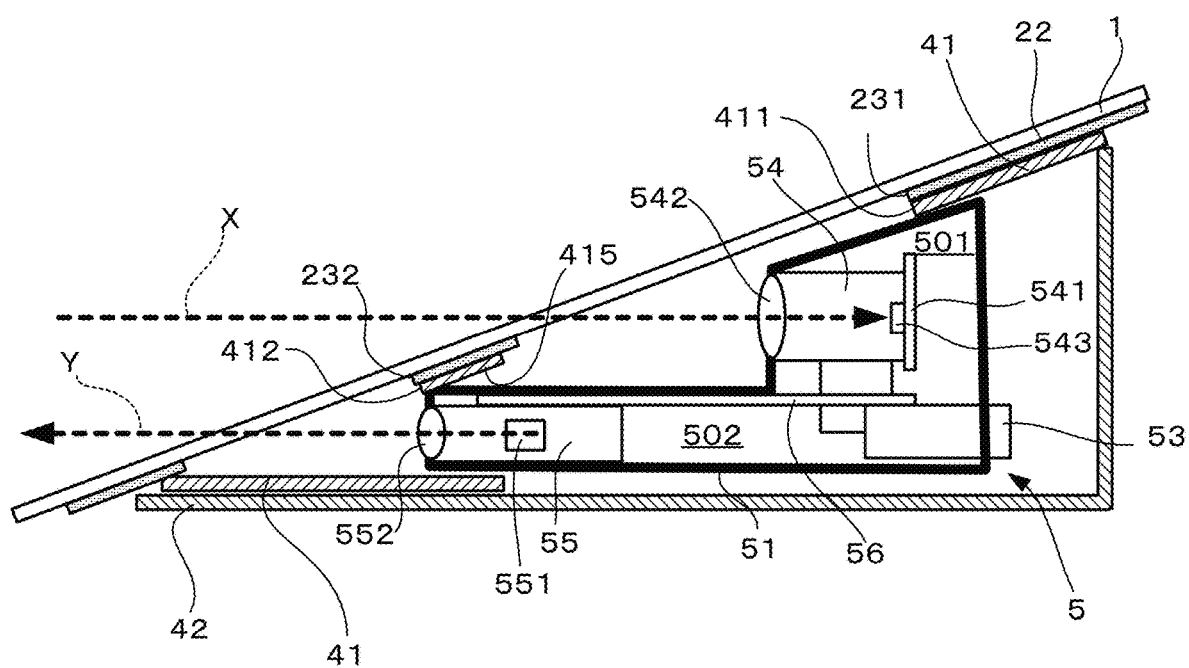
FIG. 5 is a cross-sectional view of a measurement unit.

Next, the measurement unit will be described with reference to FIGS. 5 and 6. FIG. 5 is a cross-sectional view showing a schematic configuration of the measurement unit 4 attached to the glass plate, FIG. 6(*a*) is a diagram of a bracket viewed from the outside of the vehicle, and FIG. 6(*b*) is a diagram of the bracket viewed from the vehicle interior side. As shown in FIG. 5, this measurement unit 4 is constituted by a bracket 41 fixed to an inner surface of the glass plate 1, a sensor (an electronic device) 5 supported by this bracket 41, and a cover 42 with which the bracket 41 and the sensor 5 are covered from the vehicle interior side. Note that the sensor 5 is supported by the bracket 41 fixed to the inner glass plate 12, and is not contact with the inner glass plate 12. Thus, it can be said that the sensor 5 is disposed in the vicinity of the inner glass plate 12.

Figure 6:
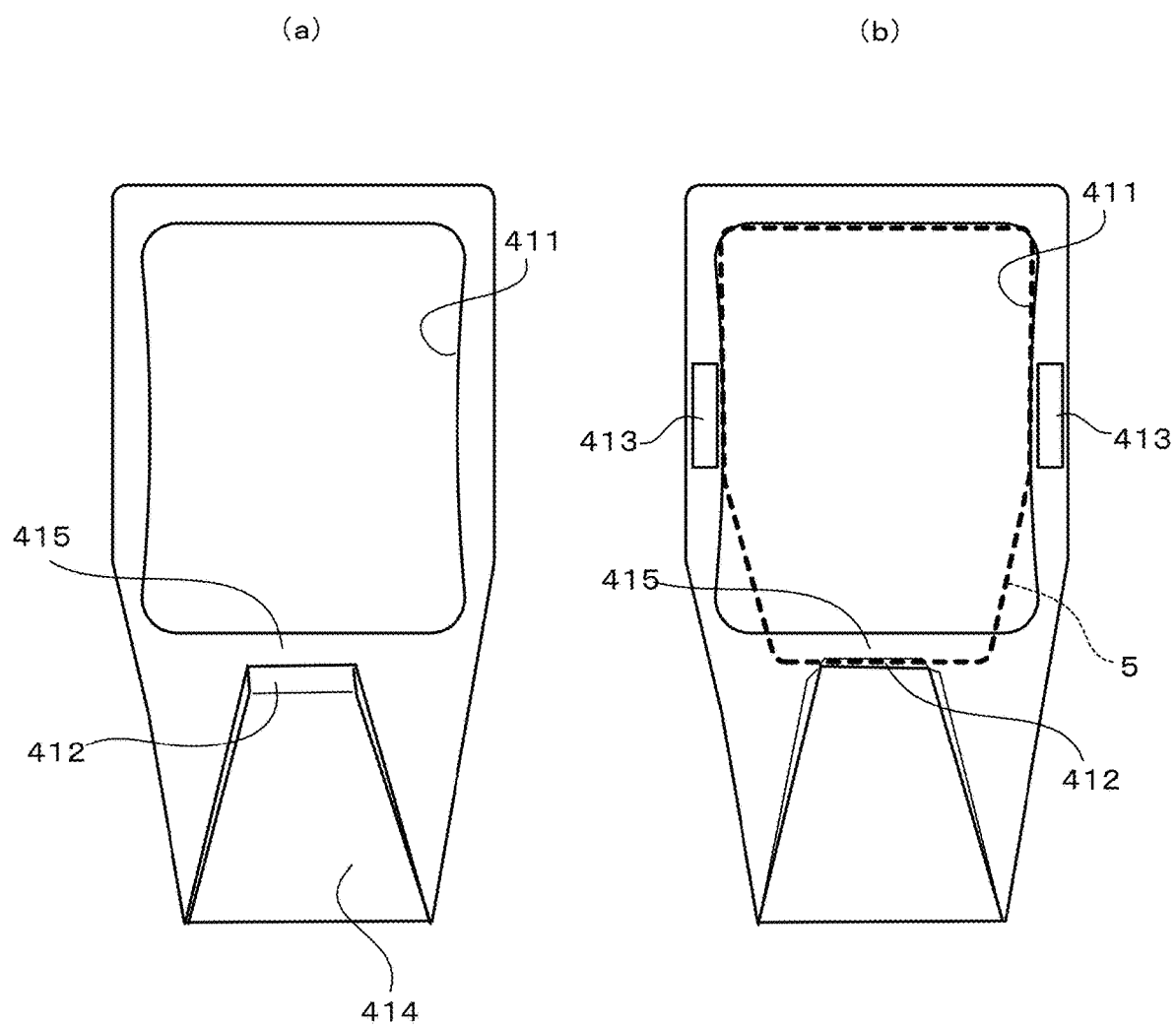
FIG. 6 is a plan view of a bracket.

As shown in FIG. 6, the bracket 41 has a rectangular shape, and is fixed to a center mask layer 22 formed on the surface of the inner glass plate 12 on the vehicle interior side, as described above. Also, this bracket 41 is provided with two openings that are aligned in the up-down direction and are separated by a partition portion 415, that is, a first opening 411 and a second opening 412, and the sensor 5 is attached to the large first opening 411 that is formed on the upper side. Also, in this bracket, a trapezoidal recess 414 is formed on the lower side of the second opening 412 viewed from the outside of the vehicle. This recess 414 is inclined such that an upper end of the recess 414 is the deepest, and the recess 414 gradually becomes shallower toward the lower end, and the upper end is provided with the second opening 412. Also, as shown in FIG. 6(*b*), support portions 413 for supporting the sensor 5 are attached to both sides of the first opening 411 on the surface of the bracket 41 on the vehicle interior side, and the sensor 5 is fixed between both support portions 413. An irradiation lens 552 is attached to a leading end (a lower end portion in FIG. 6) of the fixed sensor 5 as will be described later, and this irradiation lens 552 faces the outside via the second opening 412 and the recess 414. That is, a gap is formed between the recess 414 and the glass plate, and the recess 414 serves as a path of light emitted through the second opening 412. On the other hand, a light-receiving lens 542 faces the outside via the first opening 411.

Also, as shown in FIG. 6(*a*), the surface of this bracket 41 on the outside of the vehicle is a surface fixed to the center mask layer 22, and is fixed thereto using an adhesive or double-sided tape. Note that although various adhesives may be adopted, a urethane resin adhesive, an epoxy resin adhesive, or the like may be used, for example. However, the epoxy resin adhesive is unlikely to flow due to high viscosity, and thus, is advantageous.

A harness (not shown) and the like are attached to the bracket 41, and then, as shown in FIG. 5, the cover 42 is attached thereto from the vehicle interior side. Accordingly, the sensor 5 and the bracket 41 are not seen from the vehicle interior side. In this manner, the sensor 5 is housed in the space surrounded by the bracket 41, the cover 42, and the glass plate 1. Note that the measurement unit 4 is not seen from the outside of the vehicle due to the center mask layer 22 being formed, except for the upper opening 231 and the lower opening 232.

Next, an overview of the sensor 5 will be described with reference to FIG. 5. As shown in FIG. 5, this sensor 5 includes a housing 51 having a triangular shape in a side view, and the inner portion of this housing 51 is partitioned into an upper space 501 and a lower space 502. Also, a connector 53 is attached to a back surface side of the housing 51, and the connector 53 is used for connection to an external device.

A first support portion 54 is disposed in the upper space 501, and a first control board 541 and the light-receiving lens 542 are disposed in this first support portion 54 from the rear to the front. Also, a light-receiving element 543 is mounted on the first control board 541, and laser light that has passed through the light-receiving lens 542 is received and converted into an electric signal. This electric signal is amplified in the first control board 541, and is transmitted to a second control board 56, which will be described later. As described above, the light-receiving lens 542 is disposed to face the outside from the first opening 411 of the bracket 41 via the upper opening 231 of the center mask layer 22. In particular, the sensor 5 is supported by the bracket 41 such that the path through which light to be received by the light-receiving element 543 passes passes through the vicinity X of the center (see FIG. 5) of the upper opening 231. Also, light reflected by a leading vehicle and obstacles in multiple directions passes through the vicinity of the center of the upper opening 231, and this reflected light is received by the light-receiving element 543.

On the other hand, the second support portion 55 is disposed in the lower space 502, and a laser light-emitting element 551 and an irradiation lens 552 are supported in the stated order from the rear to the front by this second support portion 55. The laser light-emitting element 551 is a laser diode or the like that transmits laser light in a near-infrared wavelength range having a wavelength of 850 nm to 950 nm, and the irradiation lens 552 is a lens for forming laser light transmitted from the laser light-emitting element 551 into a predetermined beam shape. As described above, this irradiation lens 552 is disposed to face the outside from the housing 51 via the second opening 412 of the bracket 41 and the lower opening 232 of the center mask layer 22. In particular, the sensor 5 is supported by the bracket 41 such that the path through which laser light transmitted from the laser light-emitting element 551 passes passes through the vicinity Y of the center (see FIG. 5) of the lower opening 232.

Also, the second control board 56 is disposed on the upper surface of the second support portion 55, and the second control board 56 drives the laser light-emitting element 551, and performs processing on electric signals transmitted from the first control board 541.

Next, operations of the measurement unit 4 will be described. First, the first control board 541 transmits a pulse of laser light from the laser light-emitting element 551. A distance between a subject vehicle and the leading vehicle or an obstacle is calculated based on a time period required until light resulting from this laser light being reflected by the leading vehicle or the obstacle is received by the light-receiving element 543. The calculated distance is transmitted to an external device via the connector 53 and is used to control a brake.

4. Digital Television Antenna

Next, a digital television antenna 6 will be described. In Japan, broadcast waves for a digital television have a frequency band of about 470 to 710 MHz, and have a wavelength band of 0.42 to 0.63 m. As shown in FIG. 2, the digital television antenna 6 is disposed on the surface of the inner glass plate 12 on the vehicle interior side, and includes a power supply portion 61 disposed on a right end portion at an upper end of this inner glass plate 12 and a linear antenna main body 62 extending downward from this power supply unit 61. That is, the digital television antenna 6 is disposed such that at least a portion of the digital television antenna 6 is hidden by the mask layer 2. Also, the automobile is provided with a receiver (not shown) for digital television and an amplifier (not shown) connected to this receiver, and this amplifier is connected to the power supply unit 61.

The digital television antenna 6 is constituted by combining wires together, and these wires may be formed by stacking conductive materials such that the surface of the inner glass plate 12 on the vehicle interior side has a predetermined pattern. It is sufficient that such a material has conductivity, and examples thereof include silver, copper, gold, and platinum. Specifically, the digital television antenna 6 may be formed by printing conductive silver paste containing silver powder, glass frit and the like on the inner glass plate 12 and firing the silver paste. Also, the digital television antenna 6 may be constituted by attaching a so-called film antenna to the glass plate.

The digital television antenna 6 is not limited to a linear antenna as described above, and may have various shapes by combining wires together. Thus, there is no particular limitation on the number of elements constituting the digital television antenna 6, the length and the direction of the elements, and the like. For example, the digital television antenna 6 may be constituted by a main body element connected to the power supply unit, and a grounding element connected to ground. Also, there is no particular limitation on the position at which the digital television antenna 6 is disposed, and the digital television antenna 6 may be disposed at various positions.

The wire constituting the digital television antenna may have a thickness of 0.1 to 3 mm, for example. This is because, if the thickness of the wire is smaller than 0.1 mm, there is a risk that the wire will be disconnected, and if the thickness exceeds 3 mm, the wire is easily seen, and thus the appearance deteriorates.

Figure 7A:
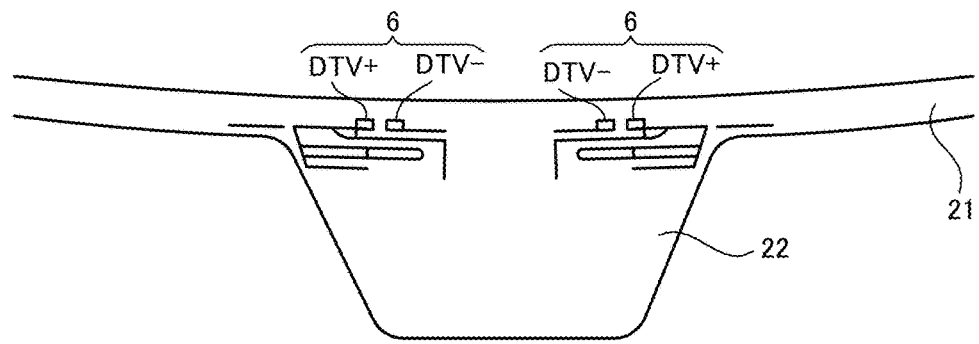
FIG. 7A is a plan view showing another example of a digital television antenna.
Figure 7B:
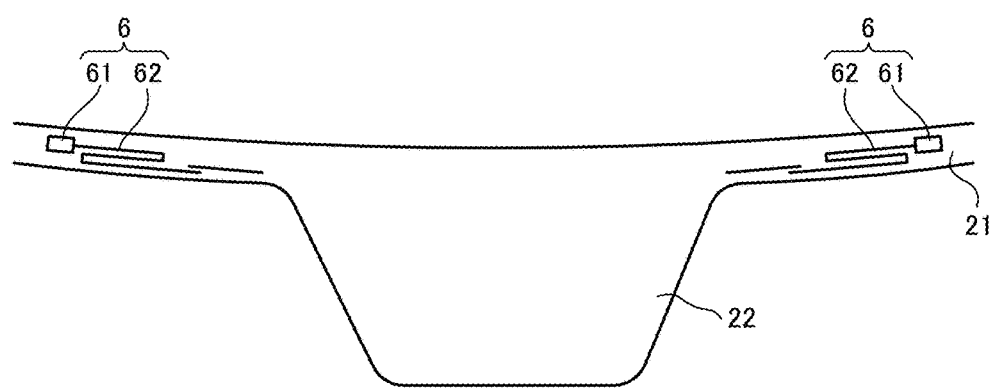
FIG. 7B is a plan view showing another example of the digital television antenna.
Figure 7C:
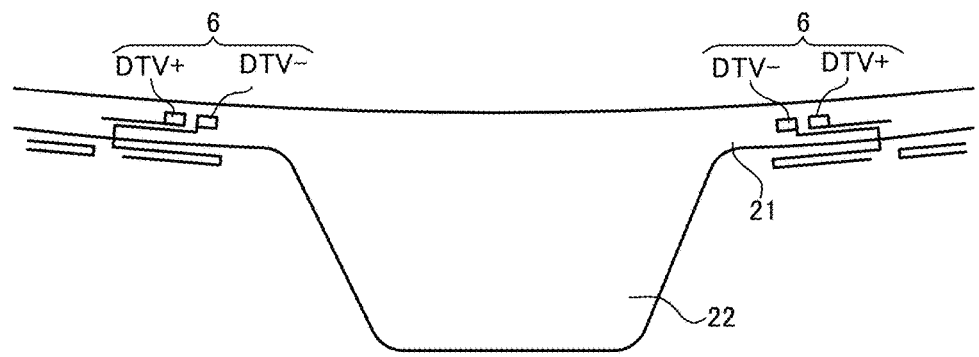
FIG. 7C is a plan view showing another example of the digital television antenna.

Note that there is no particular limitation on the shape of the digital television antenna 6, and the digital television antenna 6 may have various shapes. For example, as shown in FIGS. 7A to 7C, a digital television antenna may be constituted by combining a vertical element and a horizontal element together as appropriate, or a digital television antenna may also be constituted by a pair of antenna elements having a main body element DTV+ and an earth element DTV−. Also, with regard to an antenna configured to receive a high frequency band, such as a digital television antenna, the reception antenna realizes an equivalent reception performance even if the reception antenna is constituted by a vertical element or a horizontal element, regardless of media to be received being vertically or horizontally polarized waves. Thus, in order to confirm the effect of a canceller 7, which will be described later, the digital television antenna 6 is evaluated as a simple vertical element, but the present invention is not limited thereto. That is, with digital television antennas with various shapes including the example shown in FIG. 7, the effects of this application are obtained. Note that the digital television antenna 7 shown in FIGS. 7A to 7C mainly extends in the horizontal direction, and the reason for this is to hide most of the digital television antenna 7 in the mask layer 2, and even if the digital television antenna 7 extends in the horizontal direction in this manner, as described above, it is possible to reduce noise due to the canceller 7 of the present invention.

Figure 7D:
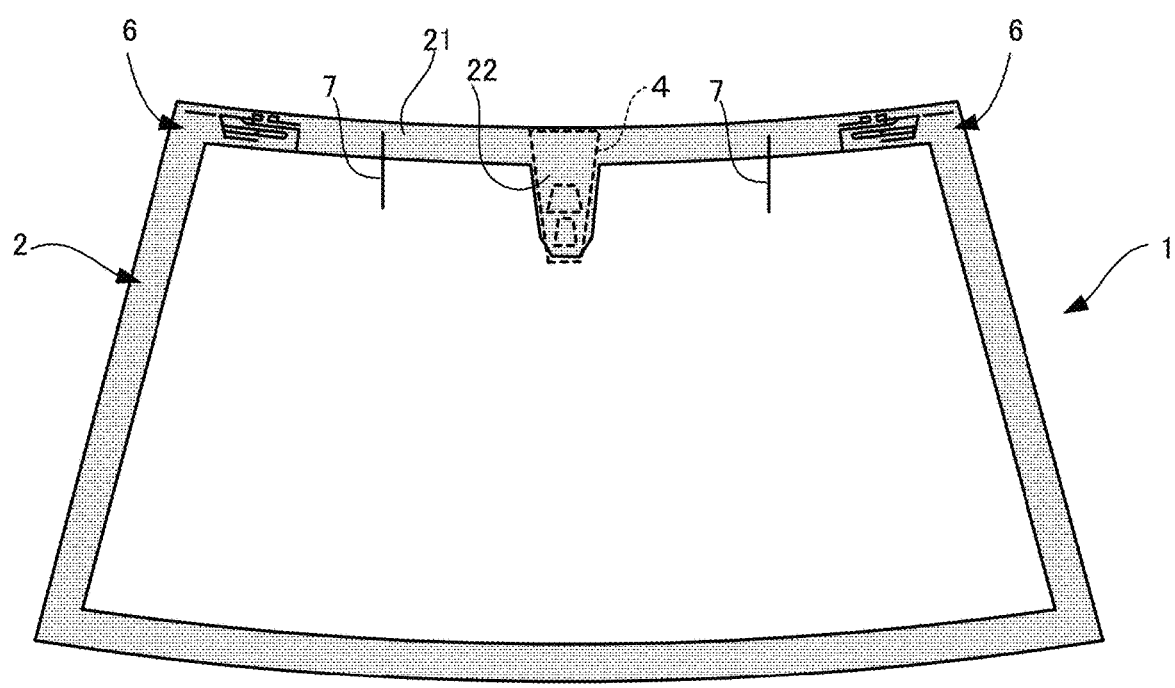
FIG. 7D is a plan view showing an example in which a canceller and a digital television antenna are disposed on a windshield.

Also, as shown in FIG. 7D, such digital television antennas 6 and cancellers 7 may be disposed on the windshield, for example. In this example, the digital television antennas 6 shown in FIG. 7A are disposed on both sides of the glass plate 1, and the cancellers 7 are disposed between the center mask layer 22 and the digital television antennas 6. However, it is also possible to dispose the digital television antennas 6 only on one of side portions of the glass plate 1 and dispose the cancellers 7 between the digital television antennas 6 and the center mask layer 22. Also, in addition to the digital television antennas shown in FIGS. 7B and 7C, digital television antennas with various modes may be disposed as the digital television antennas.

5. Canceller

The canceller 7 is for inhibiting noise from the sensor 5 from being received by the digital television antenna 6. Specifically, as shown in FIG. 2, the canceller 7 has a linear shape, and is disposed between the center mask layer 22 and the digital television antenna 6. The canceller 7 may be made of a material that is similar to that of the digital television antenna 6.

Figure 8:
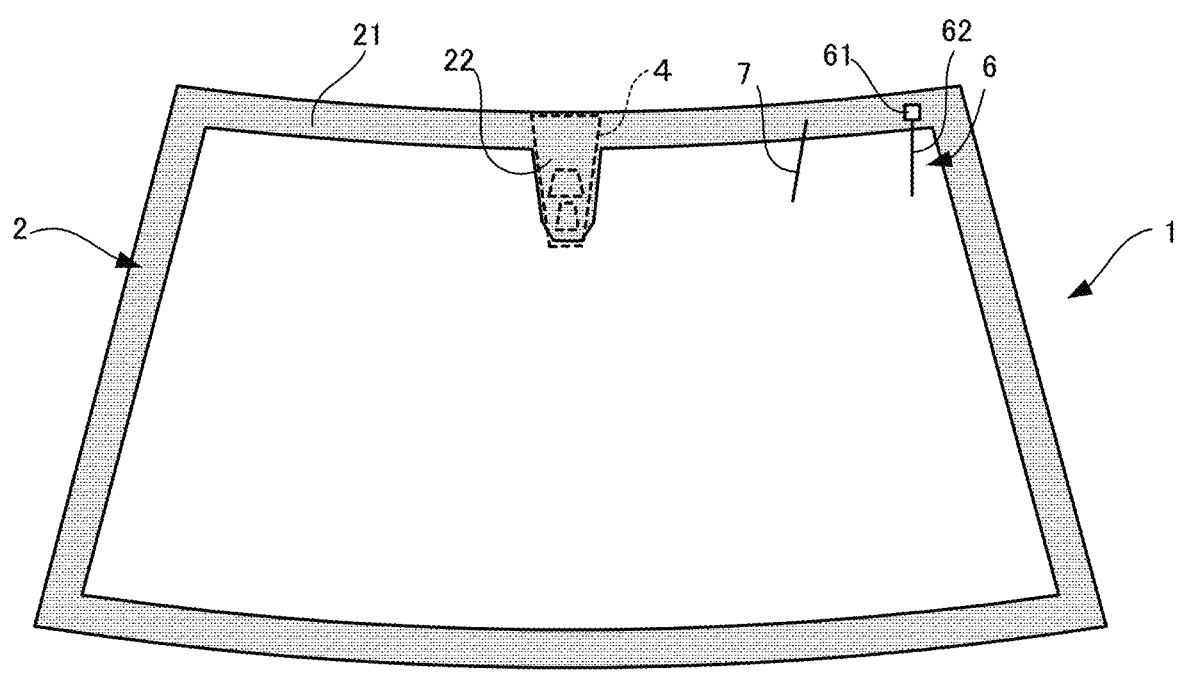
FIG. 8 is another example of a plan view of a windshield.

However, the canceller 7 may be formed into various shapes. That is, as described above, if the canceller is formed using a linear wire, when the broadcast waves received by the digital television antenna 6 have a wavelength of $\lambda_1$ to $\lambda_2$ and the glass plate has a wavelength shortening ratio of $\alpha$, for example, a total length L of the wire is preferably $\lambda_2/2*\alpha*1.06$ or more, and more preferably $\lambda_2/2*\alpha*1.16$ or more. Also, the upper limit of the total length L is preferably 2 m or less in consideration of the size of a usual glass plate. As will be described below, the same applies to the case where the canceller 7 is formed through bending. There is no particular limitation on the orientation of the canceller 7, the canceller 7 may be formed to extend as a whole in a direction orthogonal to a straight line connecting the digital television antenna 6 and the sensor 5, for example. Thus, in the present embodiment, the canceller 7 extends in the up-down direction. However, as shown in FIG. 8, the canceller 7 may also be inclined, and the inclination angle may be changed from 0 degrees (vertical) to 90 degrees (horizontal) as appropriate. Note that because the broadcast waves of the digital television antenna 6 have a wavelength of $\lambda_1$ to $\lambda_2$ and $\lambda_1$ is the shortest wavelength, as described above, if the length of the canceller 7 is $1.06*\alpha*\lambda_2$ or more, this length is naturally $1.06*\alpha*\lambda_1$ or more. Thus, the effect of the canceller 7 can be expected in all wavelength bands from $\lambda_1$ to $\lambda_2$.

A method for manufacturing the canceller 7 is similar to the method for manufacturing the digital television antenna 6, and the canceller may be formed by printing the above-described metal material on a glass plate and firing the metal material. Also, as with a film antenna, a wire for a canceller that was formed in advance may be attached to a glass plate.

Figure 9:
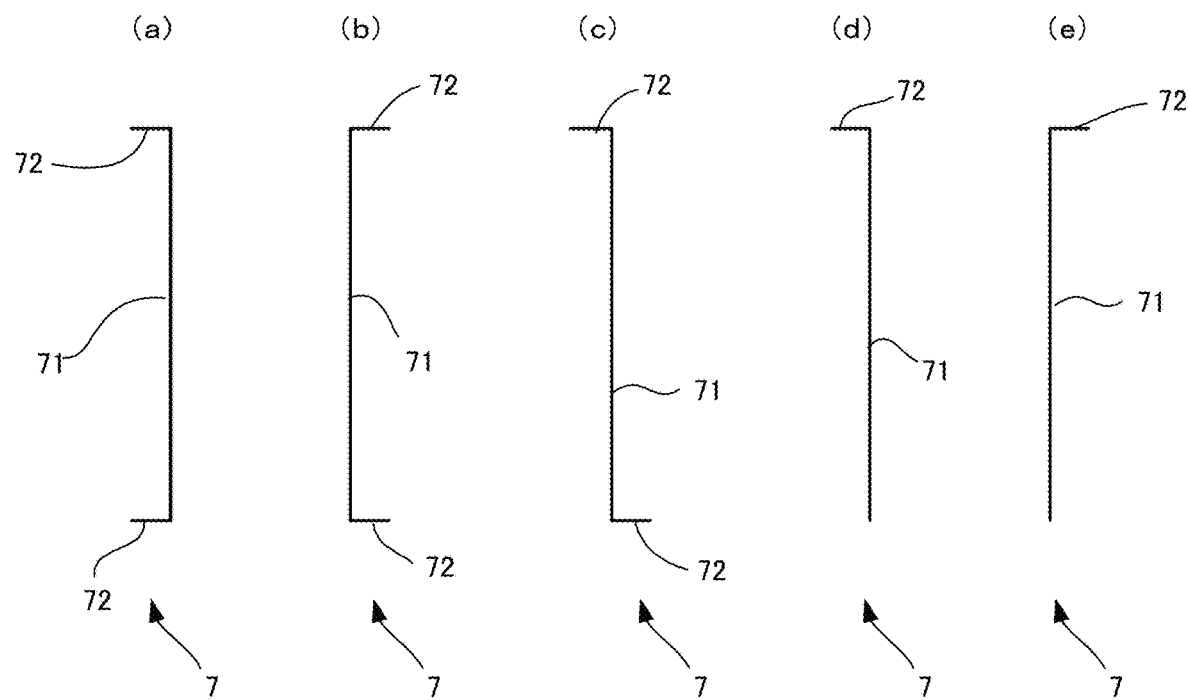
FIG. 9 is a diagram showing another example of a canceller.

The canceller may be formed by extending a wire linearly, or may be formed as shown in FIG. 9. That is, the canceller 7 may be formed using a linear first site 71 and a second site 72 that is joined to at least one of both ends of this first site 71. The second site 72 may be joined to the first site 71 to be bent. Thus, the canceller 7 may be formed into a U shape or an L shape, for example.

As described above, it is possible to extend the first site 71 in a direction that is orthogonal to a straight line connecting the digital television antenna 6 and the sensor 5, for example. In this case, as shown in 10A, the second site 72 may be joined to the first site 71 at an angle of −135 degrees to 135 degrees (when the first site 71 and the second site 72 are parallel to each other, the angle therebetween is 0 degrees). However, the second site 72 is preferably disposed facing the digital television antenna 6. Although the total length of the canceller 7 having such first site 71 and second site 72 is as described above, the first site 71 preferably has a length of $\lambda_2/2*\alpha$ or more.

Figure 10A:
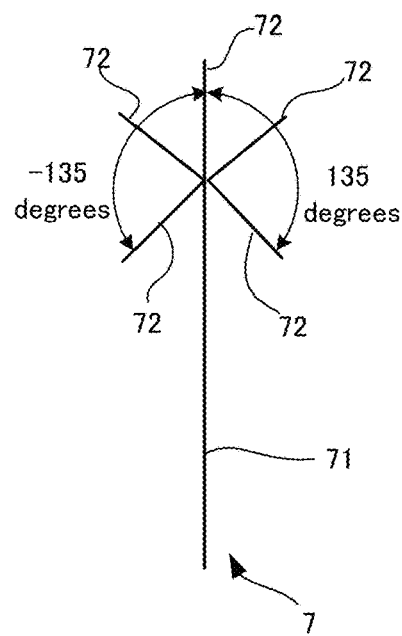
FIG. 10A is a diagram showing another example of the canceller.
Figure 10B:
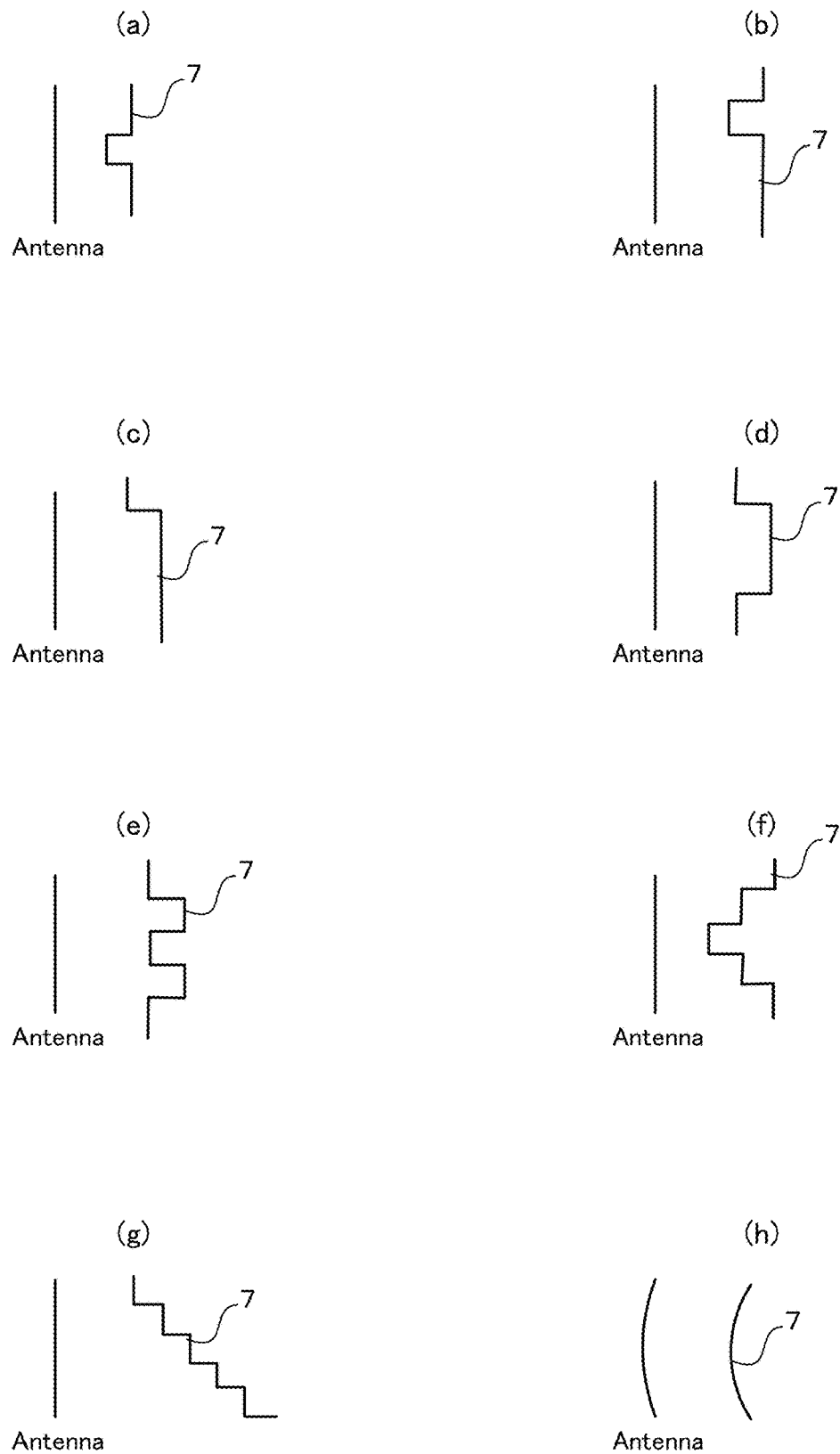
FIG. 10B is a diagram showing another example of the canceller.

Also, the canceller 7 may be provided with at least one protrusion or at least one recess. For example, the canceller 7 may have shapes as shown in FIGS. 10B(a) to 10(h). In FIGS. 10B(a) to 10(c), the canceller 7 is provided with a protrusion protruding toward the antenna (the digital television antenna), and the position of this protrusion is changed in the up-down direction. In FIG. 10B(d), the canceller 7 is provided with a protrusion oriented away from the antenna, and the width of the protrusion in the longitudinal direction is larger than in FIG. 10B(a). In FIG. 10B(e), the canceller 7 is provided with two protrusions oriented away from the antenna.

Also, in FIG. 10B(f), the canceller 7 is provided with step-shaped protrusions oriented toward the antenna, and in FIG. 10B(g), the canceller 7 is formed into a step shape that gradually separates from the antenna toward the bottom. Furthermore, in FIG. 10B(h), the antenna is formed into an arc shape, and the canceller 7 is also formed into an arc shape in correspondence therewith.

In this manner, the canceller may be formed into various shapes. In addition, the canceller 7 may have various shapes such as an E shape and a rectangular shape. In this case, it is expected that the canceller 7 has the effect not only in a specific frequency but also over a wide range. In addition, it is also possible to add a known technique to the canceller 7.

6. Relationship Between Canceller, Digital Television Antenna, and Sensor

Figure 11:
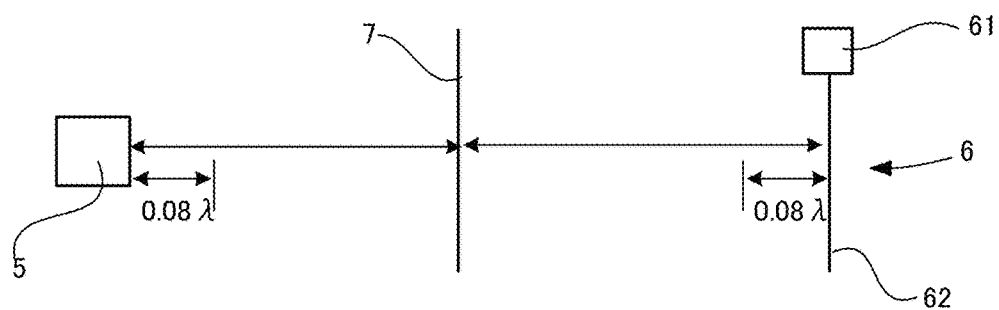
FIG. 11 is a diagram showing a positional relationship between a canceller, a sensor, and a digital television antenna.

Next, the position of the canceller 7 will be described. Although there is no particular limitation on the position of the canceller 7, as shown in FIG. 11, if the canceller 7 is disposed between the digital television antenna 6 and the sensor 5, it is preferable that the canceller 7 is located $0.08*\alpha*\lambda_2$ or more away from the sensor 5 and is located $0.08*\alpha*\lambda_2$ or more away from the digital television antenna 6. In particular, it is preferable that the canceller 7 is located about $0.3*\alpha*\lambda_2$ away from the sensor, or is located about $0.3*\alpha*\lambda_2$ away from the digital television antenna 6. However, the canceller 7 is preferably disposed closer to the sensor 5 than the center point between the digital television antenna 6 and the sensor 5. This makes it possible to reduce the influence of the digital television antenna 6 on the antenna properties. Note that because the broadcast waves of the digital television antenna 6 have a wavelength of $\lambda_1$ to $\lambda_2$ and $\lambda_1$ is the shortest wavelength, as described above, when the distance between the digital television antenna 6 and the canceller 7 is set to $0.08*\alpha*\lambda_2$ or more, this distance is naturally $0.08*\alpha*\lambda_1$ or more. Thus, the effect of the canceller 7 is expected in all wavelength bands from $\lambda_1$ to $\lambda_2$.

Herein, the distance between the sensor 5 and the canceller 7 may be the distance between the center of the canceller 7 and a portion of an end portion of the control board of the sensor 5 that is closest to the canceller 7, for example. The "center of the canceller 7" refers to the center of the total length of the canceller 7 that extends linearly. Also, the distance between the digital television antenna 6 and the canceller 7 may be set to the distance between the center of the digital television antenna 6 and the center of the canceller 7, for example. The center of the digital television antenna 6 means the center in a region in which the digital television antenna 6 is disposed. For example, if the digital television antenna 6 is constituted by the main body element and the earth element, the center of the digital television antenna 6 refers to the center of a region in which both the main body element and the earth element are disposed.

Note that the case where the canceller 7 is disposed between the sensor 5 and the digital television antenna 6 refers to the case where at least half of the length of the canceller 7 is disposed in a region formed by a line connecting an upper portion of the digital television antenna 6 and an upper portion of the sensor 5 and a line connecting a lower portion of the digital television antenna 6 and a lower portion of the sensor 5, for example.

Note that, technically, if the distance between the center of the sensor 5 and the center of the canceller 7 is a predetermined distance or more, the effect of the present invention can be expected. However, this distance in this application refers to a "distance between the center of the canceller 7 and the portion of the end portions of the control board of the sensor 5 that is closest to the canceller 7 (referred to as a "center distance" hereinafter)". With the center distance, the sensor 5 and the canceller 7 are separated from each other by at least a distance with which the effect is expected technically, and thus the effect of the present invention is always obtained.

Figure 12:
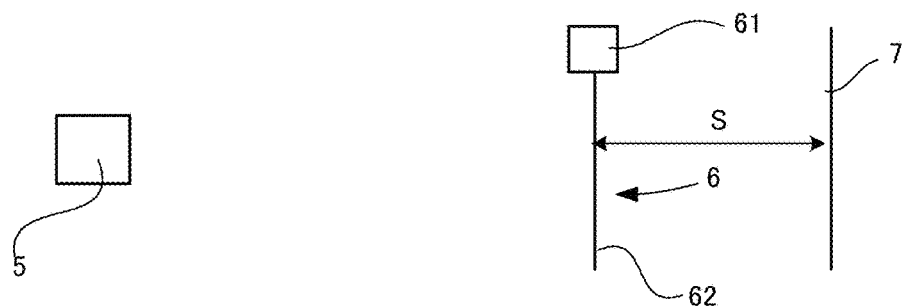
FIG. 12 is a diagram showing a positional relationship between a canceller, a sensor, and a digital television antenna.

As shown in FIG. 12, the canceller 7 may also be disposed on the side of the sensor 5 opposite to the digital television antenna 6. In this case, a distance S between the sensor 5 and the canceller 7 is preferably $\lambda_1/4*\alpha$ or less. Note that because the broadcast waves of the digital television antenna 6 have a wavelength of $\lambda_1$ to $\lambda_2$ and $\lambda_2$ is the longest wavelength, as described above, when the distance between the sensor 5 and the canceller 7 is $\lambda_1/4*\alpha$ or less, this distance is naturally $\lambda_2/4*\alpha$ or less. Thus, the effect of the canceller 7 is expected in all wavelength bands from $\lambda_1$ to $\lambda_2$. Also, it is possible to extend the canceller 7 mainly in a direction orthogonal to a straight line connecting the digital television antenna 6 and the sensor 5, and in this case, the canceller 7 preferably has a total length of $\lambda_1/2*\alpha*0.8$ or less.

7. Characteristics

The orientation of an antenna for a vehicle as described in the present embodiment relative to broadcast waves to be received may change depending on traveling of the vehicle over time, and thus an environment in which such antenna is used is different from an environment in which a fixed antenna is used. Thus, there has been no concept of reducing specific noise for a conventional antenna. In contrast, in a vehicle provided with the sensor 5 that may generate noise as in the present embodiment, both the sensor 5 and the digital television antenna 6 are fixed, and their positional relationship is fixed. In view of this, the inventors of the present invention focused on this respect and achieved an invention in which the digital television antenna 6 reduces noise received from the sensor 5 using the canceller 7. The principle of noise reduction using such a canceller 7 is as follows.

1) First, a high-frequency current is induced in the canceller 7, which is a conductor, by electromagnetic waves emitted from the sensor 5 that may be a noise source as described above.

2) If the length of the canceller 7 is slightly longer than $\lambda/2*\alpha$, the canceller 7 has dielectricity and the phase of current to be induced is delayed 90°.

3) Also, if the sensor 5 and the canceller 7 are disposed at a distance of about $\lambda/4*\alpha$, the phase of the electromagnetic wave traveling from the canceller 7 to the digital antenna 6 is delayed 90°.

4) Thus, the electromagnetic wave traveling from the canceller 7 to the digital antenna 6 has a phase delay of 180° in total together with a phase delay of 90° caused by dielectricity. That is, electromagnetic waves with the opposite phase are emitted from the canceller 7 to the digital television antenna 6.

5) On the other hand, all of the electromagnetic waves emitted from the sensor 5 are not absorbed by the canceller 7 and part of the electromagnetic waves reach the digital television antenna 6, and these electromagnetic waves are multiplexed with the electromagnetic waves emitted from the canceller 6 described in 4). The phases of these electromagnetic waves are opposite each other, and thus these electromagnetic waves cancel each other out and become smaller.

According to the principle as described above, the canceller 7 according to the present embodiment is capable of reducing noise from the sensor 5.

8. Modifications

Although one embodiment of the present invention was described above, the present invention is not limited to the above-described embodiment, and various modifications can be made without departing from the gist thereof. Note that the following modifications may be combined as appropriate.

8-1

Figure 13:
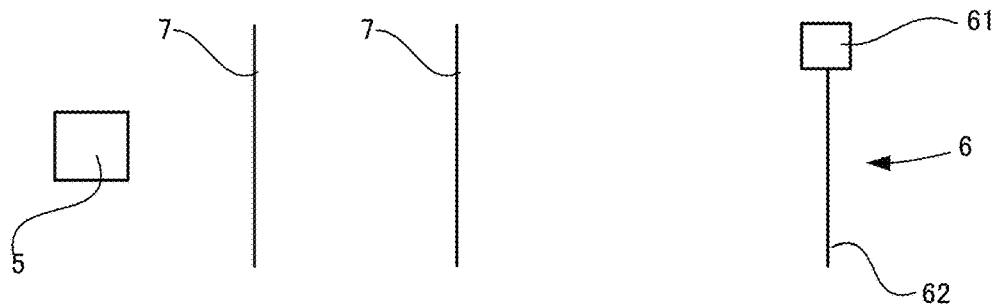
FIG. 13 is a diagram showing a positional relationship between a canceller, a sensor, and a digital television antenna.

Although one canceller 7 is provided in the above-described embodiment, as shown in FIG. 13, two or more cancellers 7 may be provided. For example, it is also possible to dispose a plurality of cancellers 7 between the digital television antenna 6 and the sensor 5 or dispose a plurality of cancellers 7 on the side of the sensor 5 opposite to the digital television antenna 6. Alternatively, it is also possible to dispose at least one canceller 7 between the digital television antenna 6 and the sensor 5, and at least one canceller 7 on the side of the sensor 5 opposite to the digital television antenna 6.

8-2

The shape of the canceller 7 described in the above-described embodiment is one example, and a wire may be formed into various shapes. That is, there is no particular limitation on the length, direction, and the like of the canceller 7. Also, the position of the canceller 7 is preferably disposed on a straight line connecting the sensor 5 and the digital television antenna 6.

8-3

The digital television antenna 6 is applied as the antenna of the present invention in the above-described embodiment, but may be an FM antenna, an AM antenna, or a DAB antenna, in addition to the digital television antenna. In addition to the antenna, it is also possible to dispose an antenna for another medium that is different from this antenna.

8-4

Although the sensor 5 is used as the electronic device of the present invention in the above-described embodiment, in addition to this, there is no particular limitation on the electronic device as long as it will generate noise. For example, a visible light and/or infrared camera for measuring an inter-vehicular distance, a light-receiving apparatus configured to receive signals from the outside of a vehicle, such as an optical beacon, a camera that is configured to read white lines and the like on a road using an image and in which visible light and/or infrared rays are used, a stereo camera, and the like correspond to the electric device. Also, the canceller of the present invention may be applied to an electronic device that generates noise with a frequency range of 400 to 800 MHz, for example.

8-5

Although the electronic device according to the present invention is disposed in the vicinity of the glass plate, "disposed in the vicinity" means that the electronic device is not in direct contact with the glass plate and is disposed in a range in which the electronic device influences the reception performance of the antenna. Thus, as described above, as an aspect of the window glass according to the present invention, the window glass is sometimes constituted integrally with the glass plate (or laminated glass) in a state of being supported by the bracket, but this case is also included in the scope of the present invention as long as the electronic device is not in contact with the glass plate.

8-6

Although the example in which the window glass of the present invention is applied to a windshield was described in the above-described embodiment, the present invention is not limited thereto, and the window glass may also be applied to a rear glass of an automobile. Thus, the window glass is not necessarily provided with the mask layer 2.

Working Examples

Hereinafter, working examples of the present invention will be described below. However, the present invention is not limited to the working examples below.

Hereinafter, EMCStudio (manufactured by EMCos), which is antenna simulation software, was used. With this software, a noise current generated in the antenna due to the influence of a noise source can be obtained by performing simulation of the antenna using a method of moments. In view of this, the performance of the canceller according to the present invention was evaluated through simulation using the above-described software.

Note that in simulation below, an antenna, a canceller, and a noise source were disposed in contact with each other on a glass plate having a thickness of 3.5 mm and a shape of 1 m×2 m. Also, wires with a width of 1.6 mm were used for the antenna, the canceller, and the noise source. Also, hereinafter, in order to simplify the description, the lengths of the antenna and the canceller, and the lengths associated with these (the distance between the antenna and the canceller, for example) are indicated by lengths in the air. However, in actuality, the antenna, the canceller, and the noise source are disposed on the glass plate, and thus, lengths and distances obtained by multiplying the lengths and distances thereof by the wavelength shortening ratio α (about 0.7) of glass are the actual lengths and distances. Thus, the length or distance obtained by multiplying the length or distance obtained in the working examples below by the wavelength shortening ratio α is defined in the present invention. Although the noise source is disposed on the glass plate in order to simplify testing in this manner, as described above, a sensor or the like that is the noise source is usually separated from the glass plate. However, in both the case where the noise source is separated from the glass plate, and the case where the noise source is in contact with the glass plate, it is possible to obtain a noise reduction effect using the canceller of the present invention.

Note that even in the case where the noise source is disposed away from the glass plate, the case where the glass plate is bent and the canceller and the noise source are disposed on this recessed surface, and the case where the canceller and the noise source are in contact with the glass plate, if the canceller or the noise source is thick, for example, the rate at which electromagnetic waves transmitted from the noise source reach the canceller through an air is high, and the glass plate has little influence. In these cases, the wavelength shortening ratio α changes, or the wavelength shortening ratio α need not be considered in some cases.

A. Examination of Position of Canceller 1

Figure 14:
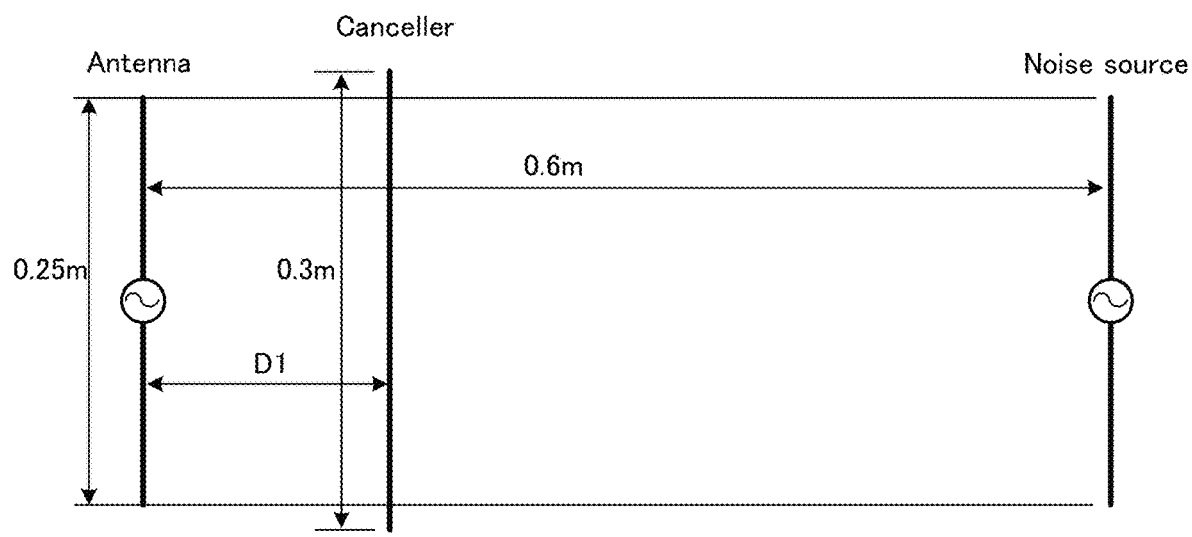
FIG. 14 is a model diagram of Test 1 according to a working example of the present invention.

An antenna, a canceller, and a noise source were disposed as shown in FIG. 14. The antenna corresponds to the antenna of the present invention, and a linear dipole antenna was used thereas. The canceller was formed into a linear shape. Also, the noise source corresponds to the electronic device according to the present invention, and a linear dipole antenna was used thereas. These were disposed in parallel to each other at predetermined intervals.

Note that in this working example, the reason why the dipole antenna was used is as follows. That is, the dipole antenna has broad directivity, or in other words, the dipole antenna does not have directivity in a specific direction. Thus, if the dipole antenna is used as the noise source, the effect of the canceller can be examined under stricter conditions than in the case where an electronic device producing noise with directivity is used. Also, persons skilled in the art can easily understand that the canceller verified under these conditions can be utilized to reduce noise produced from various electronic devices such as the sensor of the above-described embodiment. Thus, in Tests 1 to 13 described below, simulation was performed using the dipole antenna as the noise source.

Evaluation was performed as follows. Electromagnetic waves of 600 MHz (the wavelength λ=0.5 m) were transmitted from the noise source, and the manner in which those electromagnetic waves were received by the antenna upon being influenced by the canceller was evaluated. The length of the antenna and the length of the noise source were set to 0.25 m. This length is ½ the length (=λ/2) of the wavelength λ (=600 MHz) of electromagnetic waves transmitted from the noise source. Also, the length of the canceller was 0.30 m.

Herein, the reason why electromagnetic waves of 600 MHz were transmitted from the noise source is as follows. That is, in a vehicle, an electronic device and an engine may be the noise sources for the antenna. Low frequency noise as AM broadcast waves is produced from the engine, for example. On the other hand, an electronic device produces high frequency noise in some cases, in addition to low frequency noise. Thus, if the window glass according to the present invention is provided with a digital television antenna, cutting noise at about 600 MHz, which is in the center wavelength band, has great technical significance.

Figure 15:
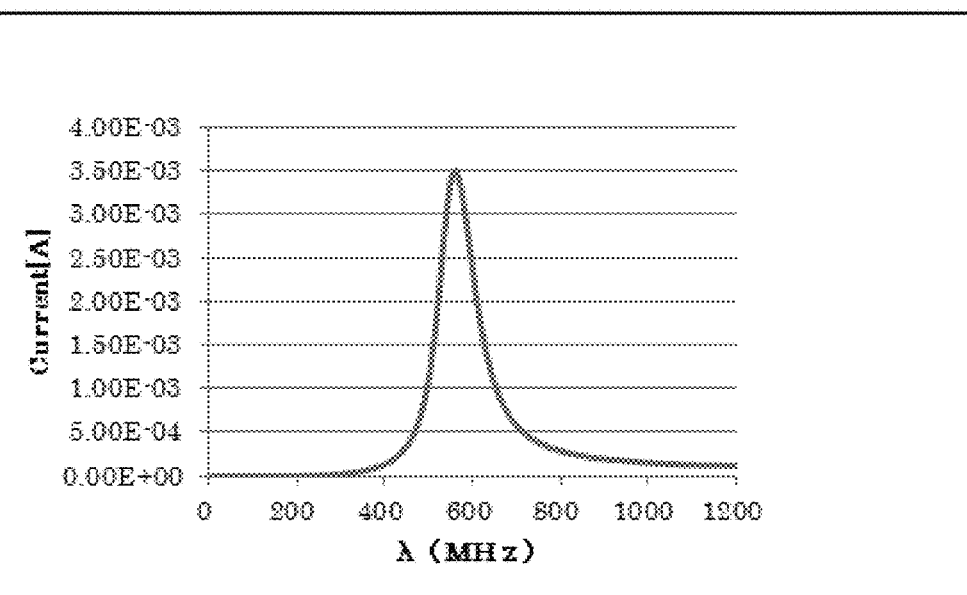
FIG. 15 shows the spectrum of electromagnetic waves transmitted from dipole antennas of Tests 1 to 13.

In view of this, in the testing described below, a dipole antenna capable of transmitting electromagnetic waves centered about 600 MHz was used as the noise source, and the electromagnetic waves were transmitted. FIG. 15 shows spectra of electromagnetic waves transmitted from this dipole antenna. In the graph shown in FIG. 15, the electromagnetic wave output has a peak at 570 MHz, and the peak is slightly deviated from 600 MHz. The reason for this is that a reactance component (an impedance imaginary part) is not 0 at 600 MHz, and is close to 0 at 570 MHz. Note that such electromagnetic waves are also similarly transmitted in testing below.

Herein, a method for calculating the wavelength shortening ratio α will be described. First, a 0.25 m dipole antenna with no glass plate had a peak at 570 MHz. On the other hand, when the length of the glass antenna was adjusted to have a peak at the same wavelength, the resulting length was 0.175 m. The wavelength shortening ratio α (0.175/0.25=0.7) was obtained based on this result.

In Test 1, the distance between the antenna and the noise source was set to 0.6 m, the position of the canceller was changed between the antenna and the noise source, and the receiving sensitivity of the antenna was calculated. Also, in Test 2, the distance between the antenna and the noise source was set to 1.0 m.

Figure 16A:
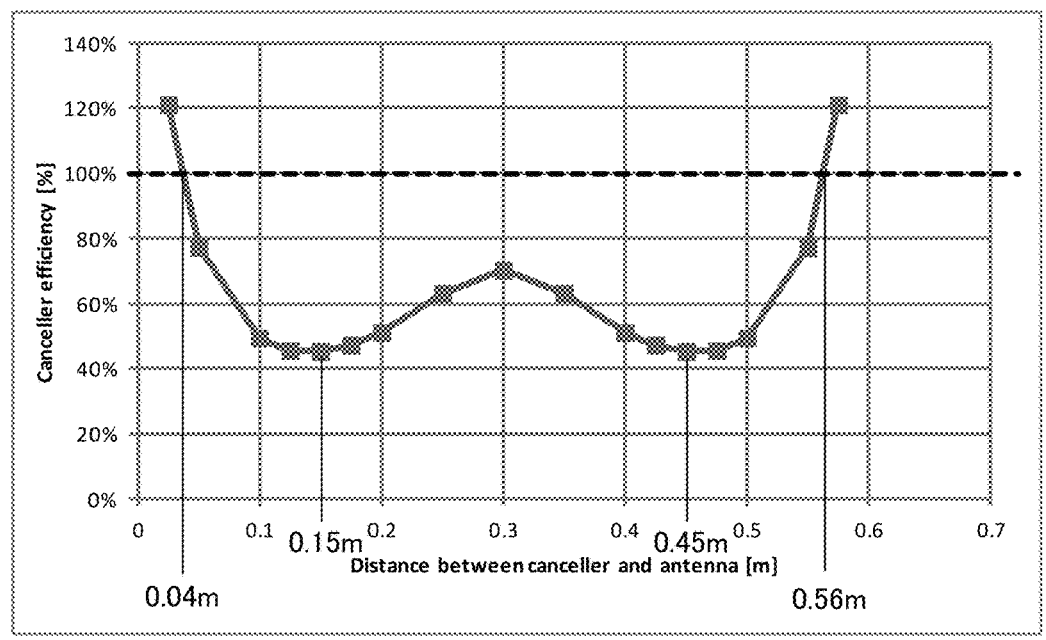
FIG. 16A is a graph, which is the result of Test 1, showing a relationship between the receiving sensitivity of an antenna and a distance between the antenna and a canceller.

The results of Test 1 are shown in FIG. 16A. In FIG. 16A, the horizontal axis indicates a distance D1 between the antenna and the canceller. On the other hand, the vertical axis indicates the percentage of the induced current, where the induced current generated in the antenna when no canceller is provided is 100%. The same applies to the tests described below. Thus, it is thought that if the induced current in the vertical axis is lower than 100%, the induced current generated in the antenna is reduced by the canceller, and thus it is possible to reduce the influence of noise produced from the noise source.

Also, a test was performed where the length of the canceller was 0.35 and electromagnetic waves of 500 MHz, 600 MHz, and 800 MHz were transmitted from the noise source, and the other conditions were the same as the above. The results are shown in FIG. 16B.

Figure 16B:
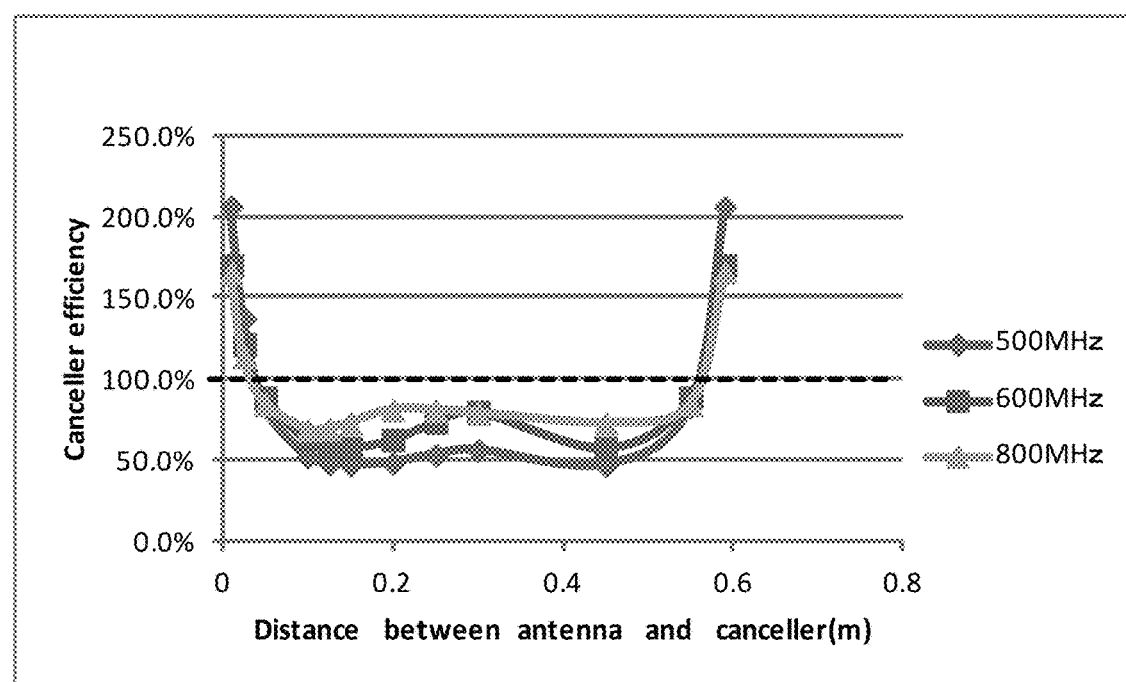
FIG. 16B is a graph, which is the result of Test 1, showing a relationship between the receiving sensitivity of an antenna and a distance between the antenna and a canceller.
Figure 17A:
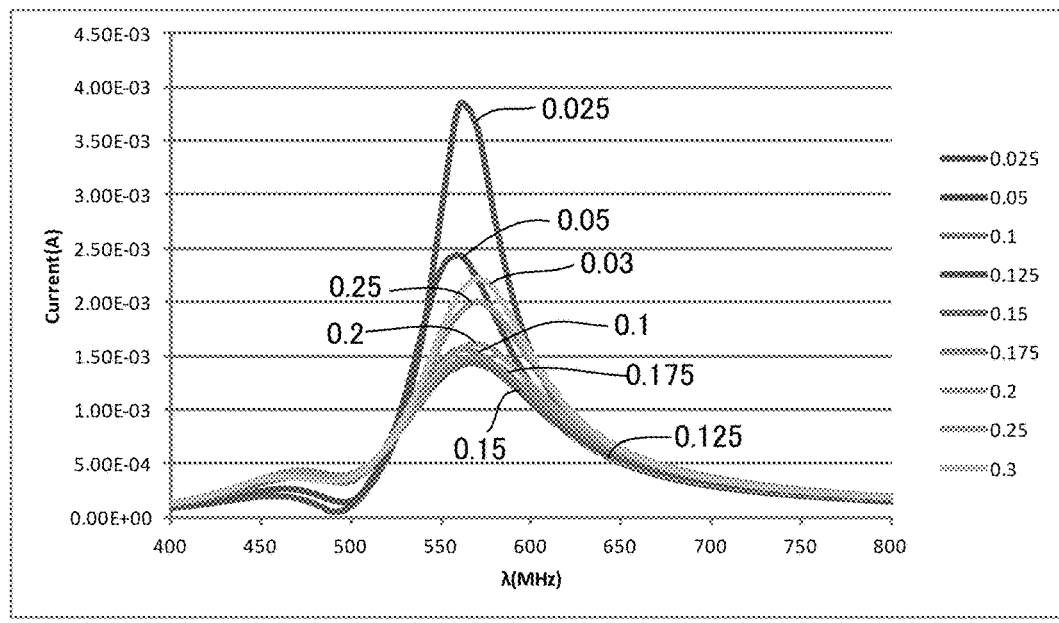
FIG. 17A is a graph showing a relationship between frequency and receiving sensitivity at each position of the canceller in Test 1.
Figure 17B:
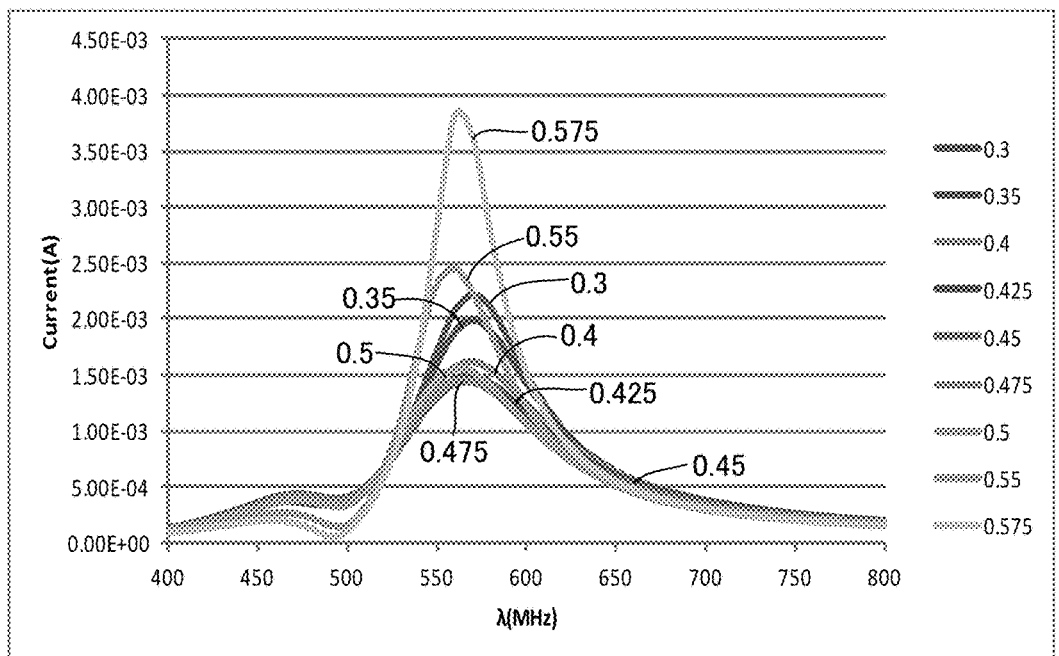
FIG. 17B is a graph showing a relationship between frequency and receiving sensitivity at each position of the canceller in Test 1.

Note that the induced current generated in the antenna changes depending on the frequency, and thus the induced current at each position of the canceller shown in FIGS. 16A and 16B has a peak in a frequency range of 10 to 1800 MHz. For example, FIGS. 17A and 17B show frequency spectra at each position of the canceller, and FIG. 16A above shows the frequency spectra obtained by plotting the induced current at peaks at the positions of the canceller shown in FIGS. 17A and 17B. The same applies to FIGS. 18, 19, 21, 22, 24, 26, and 35 below.

As shown in FIG. 16A, when the canceller is located between a position located about 0.04 m (=about 0.08λ) away from the antenna and a position located about 0.04 m (=about 0.08λ) away from the noise source, the induced current was lower than the induced current generated when no canceller was provided. Thus, it is understood that when the canceller is located at this position, the canceller functions effectively. Note that the graph shown in FIG. 16A is substantially symmetrical with respect to the time when the position of the canceller is 0.3 m, and when the canceller is located about 0.15 m (=about 0.3λ) away from the antenna and located about 0.15 m (=about 0.3λ) away from the noise source, the induced current is at the minimum. The above observation is also the same as FIG. 16B. Thus, even if the frequency of the noise source changes, the canceller 7 has the same effect.

Also, as described above, the position of the canceller has an extremum at 0.3λ, and thus, when the center wavelength of a target broadcast wave is λc, and if the distance between the antenna and the canceller is (0.3±0.05)*λc, or the distance between the noise source and the canceller is (0.3±0.05)*λc, for example, it is possible to maximize the effect of the canceller in all wavelength bands from $\lambda_1$ to $\lambda_2$ of the broadcast waves of the antenna.

Figure 18:
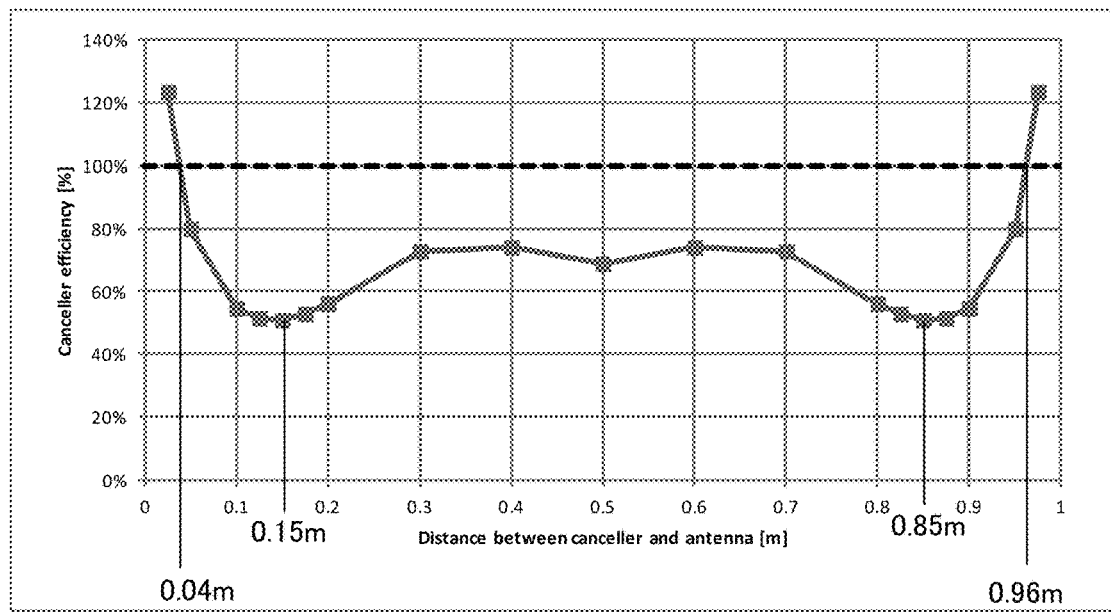
FIG. 18 is a graph showing a relationship between frequency and receiving sensitivity at each position of the canceller in Test 2.

Next, the results of Test 2 will be described with reference to FIG. 18. As shown in FIG. 18, the same result as in Test 1 was obtained also in the case where the distance between the antenna and the noise source was 1 m. That is, the graph that is symmetric with respect to 0.5 m, which is the center position between the antenna and the noise source, was generated. Also, when the canceller was located between the position located about 0.04 m (=about 0.08λ) away from the antenna and the position located about 0.04 m (=about 0.08λ) away from the noise source, the induced current was lower than the induced current generated when no canceller was provided. Also, when the canceller is located at the position located about 0.15 m (=about 0.3λ) away from the antenna and the position located about 0.15 m (=about 0.3λ) away from the noise source, the induced current is at the minimum.

Figure 19:
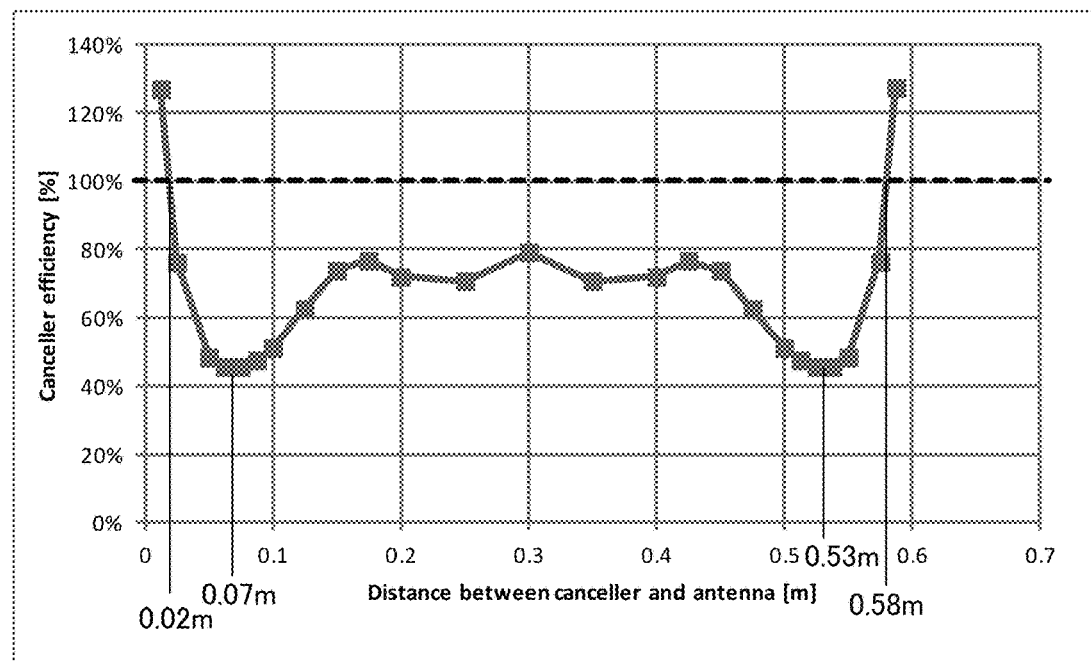
FIG. 19 is a graph showing a relationship between frequency and receiving sensitivity at each position of the canceller in Test 3.

Next, a test that is similar to Test 1 was performed as Test 3, except that the frequency of electromagnetic waves transmitted from the noise source was 1200 MHz (the wavelength λ=0.25 m), which was double that of Test 1, the length of the antenna and the length of the noise source were set to 0.125 m, which was half of the length in the above-described test, and the length of the canceller was also 0.15 m, which was half of the length in the above-described test. The results are shown in FIG. 19. As shown in FIG. 19, the shape of the graph is substantially the same as that of FIG. 16, and the graph that is symmetrical about 0.3 m, which is the center position between the antenna and the noise source, was generated. Also, when the canceller was located between the position located about 0.02 m (=about 0.08λ) away from the antenna and the position located about 0.02 m (=about 0.08λ) away from the noise source, the induced current was lower than the induced current generated when no canceller was provided. Also, when the canceller was located at the position located about 0.07 m (=about 0.3λ) away from the antenna and the position located about 0.07 m (=about 0.3λ) away from the noise source, the induced current was at the minimum.

Thus, it was found that it is appropriate to evaluate the position of the canceller based on the wavelength of electromagnetic waves. Thus, it was found that the canceller is preferably disposed at a position that is located 0.08λ or more away from the antenna and is located 0.08λ or more away from the noise source.

B. Examination of Length of Canceller 1

Figure 20:
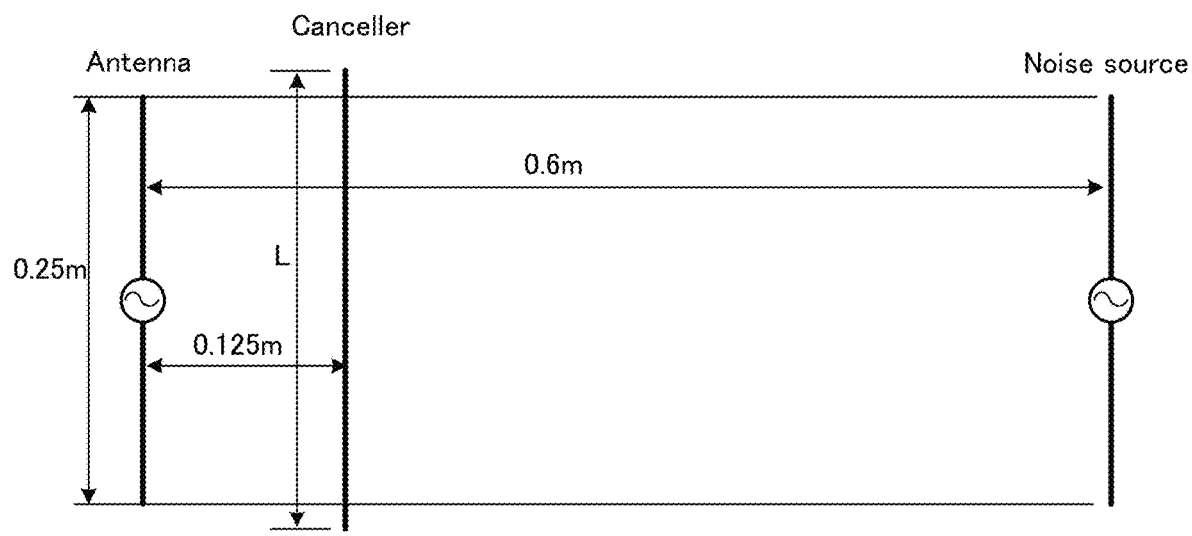
FIG. 20 is a model diagram of Test 4 according to a working example of the present invention.

As shown in FIG. 20, a test model was produced in Test 4. That is, similarly to Test 1 above, an antenna, a canceller, and a noise source were disposed in the stated order, and electromagnetic waves of 600 MHz (the wavelength λ=0.5 m) were transmitted from the noise source. The distance between the antenna and the canceller was set to 0.125 m (=λ/4), and the distance between the antenna and the noise source was set to 0.6 m. Also, the length of the antenna and the length of the noise source were set to 0.25 m (=λ/2), a length L of the canceller was changed, and an induced current generated in the antenna was calculated. The results are shown in FIG. 21.

Figure 21:
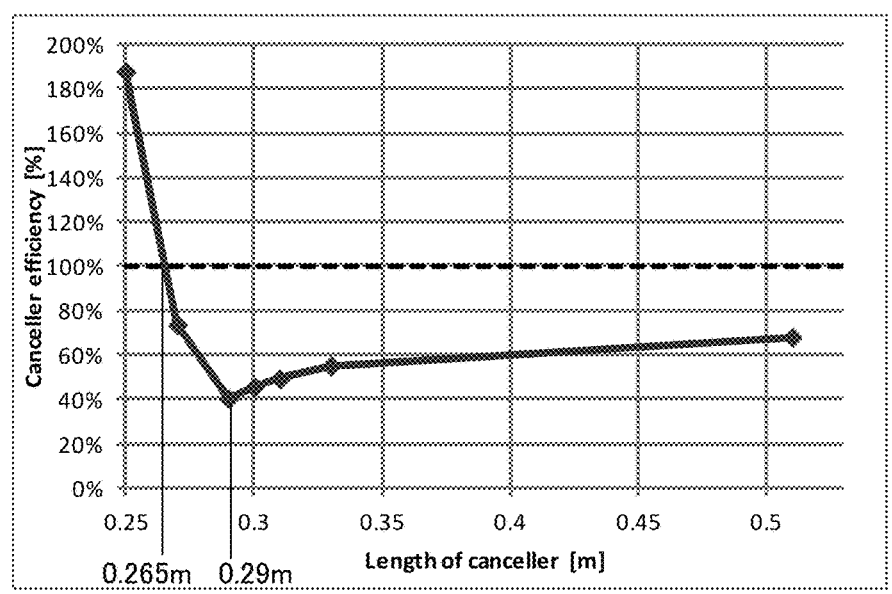
FIG. 21 is a graph showing a relationship between frequency and receiving sensitivity at each position of the canceller in Test 4.
Figure 22:
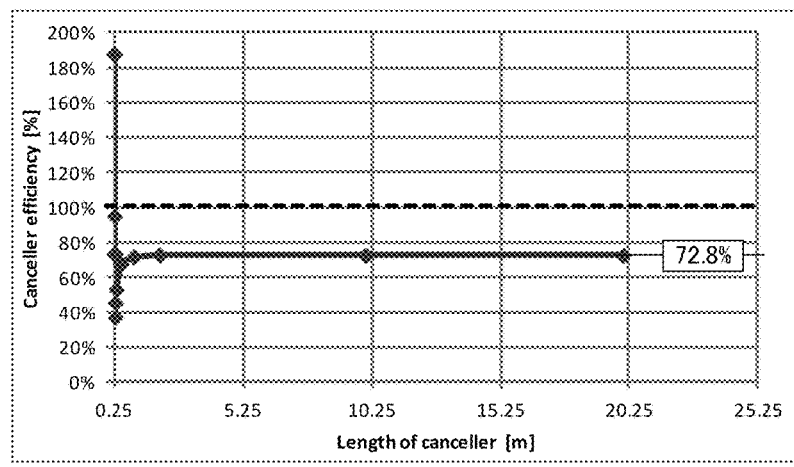
FIG. 22 is a graph showing a relationship between frequency and receiving sensitivity at each position of the canceller in Test 5.

It was found that, as shown in FIG. 21, if the length L of the canceller is longer than about 0.265 m (=λ/2*1.06), the induced current is lower than 100%. Also, it was found that the induced current is at the minimum when the length of the canceller was about 0.29 m (=λ/2*1.16), and even if the length of the canceller is longer than about 0.29 m, the induced current is stably low.

Furthermore, in Test 5, the induced current of the antenna was calculated with the length L of the canceller further increased to 1.01 m, 2.01 m, 10.01 m, and 20.01 m, and the results are shown in FIG. 21. As shown in FIG. 21, even when the length of the canceller was increased, the percentage of the induced current was substantially constant at 72.8%. Thus, it was found that no matter how long the length L of the canceller is made, noise can be reduced more than in the case where no canceller is provided.

C. Examination of Length of Canceller 2

Figure 23:
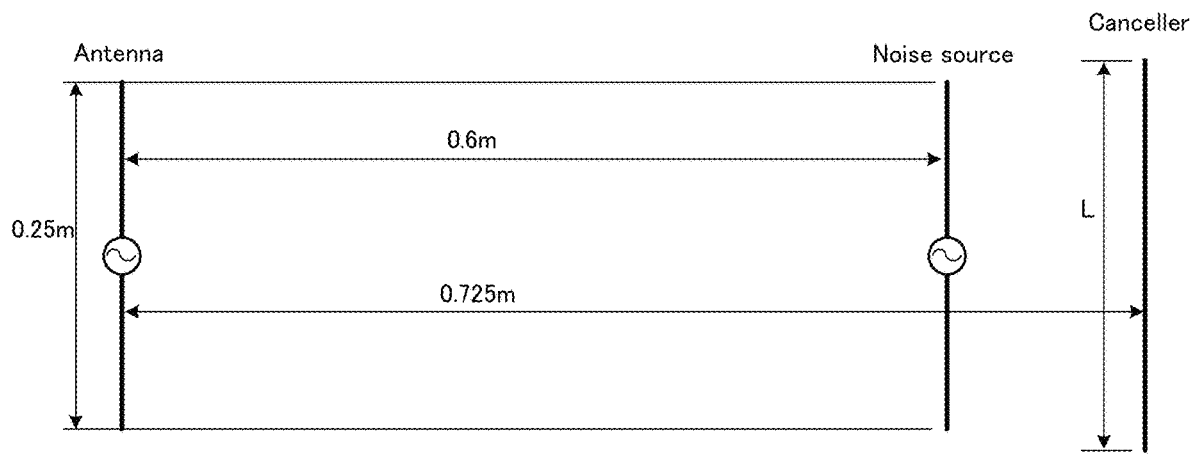
FIG. 23 is a model diagram of Test 6 according to a working example of the present invention.

A test model shown in FIG. 23 was produced in Test 6. That is, unlike Test 1, a canceller was disposed on the side of a noise source opposite to an antenna. That is, the distance between the antenna and the noise source was set to 0.6 m and the distance between the antenna and the canceller was set to 0.725 m. Also, electromagnetic waves of 600 MHz (the wavelength $\lambda=0.5$ m) were transmitted from the noise source. Also, the length of the antenna and the length of the noise source were set to 0.25 m ($=\lambda/2$), the length of the canceller was changed, and the induced current generated in the antenna was calculated. The results are shown in FIG. 24.

Figure 24:
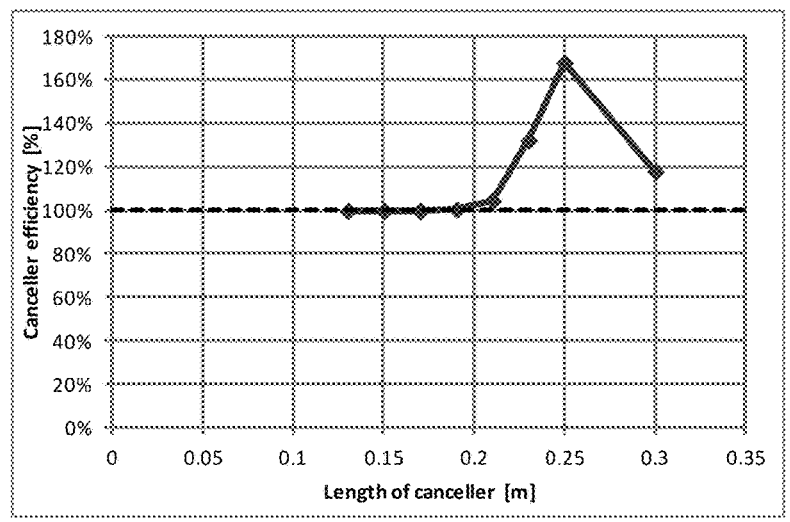
FIG. 24 is a graph showing a relationship between frequency and receiving sensitivity at each position of the canceller in Test 6.

It was found that, as shown in FIG. 24, if the length of the canceller is longer than about 0.20 m ($=\lambda/2*0.8$), the induced current is larger than 100%. Thus, it was found that if the canceller is disposed on the side of the noise source opposite to the antenna, the length of the canceller is preferably set to $\lambda/2*0.8$ or less.

D. Examination of Position of Canceller 2

Figure 25:
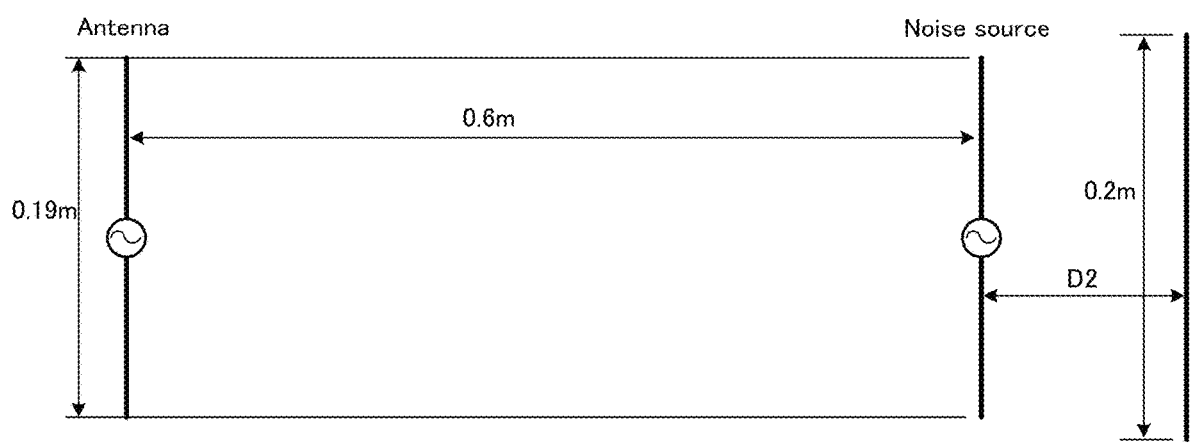
FIG. 25 is a model diagram of Test 7 according to a working example of the present invention.

As shown in FIG. 25, a test model was produced in Test 7. That is, similarly to Test 6 above, an antenna, a noise source, and a canceller were disposed in the stated order, and electromagnetic waves of 600 MHz (the wavelength $\lambda=0.5$ m) were transmitted from the noise source. From the findings in Test 6 above, the length of the canceller was set to 0.20 m, and the length of the antenna and the length of the noise source were set to 0.19 m, which is shorter than the canceller. Also, a distance D2 between the noise source and the canceller was changed, and the induced current generated in the antenna was calculated. The results are shown in FIG. 26.

Figure 26:
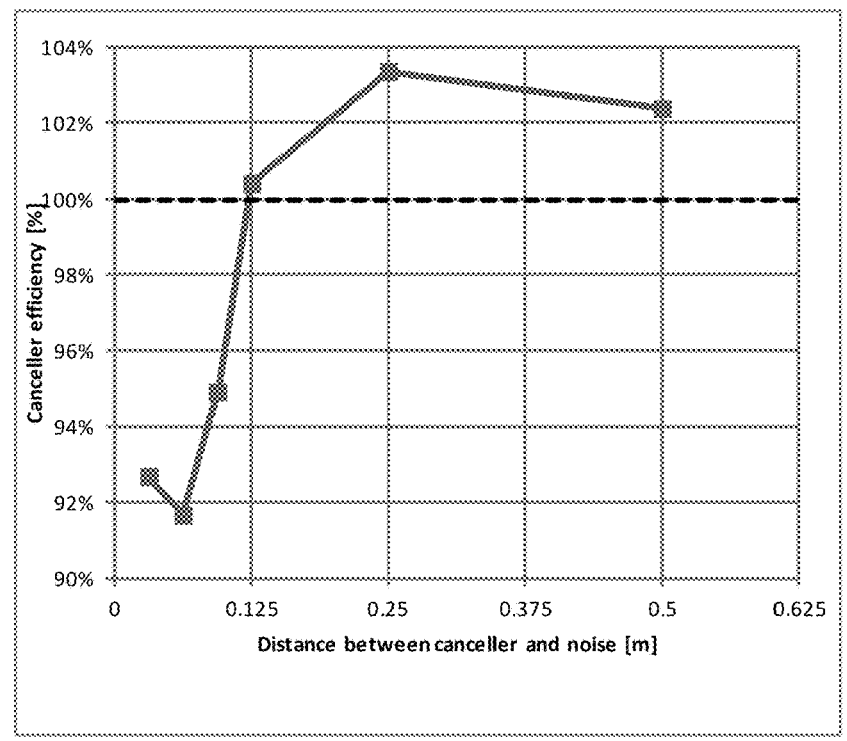
FIG. 26 is a graph showing a relationship between frequency and receiving sensitivity at each position of the canceller in Test 7.

It was found that, as shown in FIG. 26, if the distance D2 between the noise source and the canceller exceeds 0.125 m ($=\lambda/4$), the induced current generated in the antenna is larger than 100%. Thus, it was found that if the canceller is disposed on the side of the noise source opposite to the antenna, the distance between the noise source and the canceller is preferably set to $\lambda/4$ or less.

E. Examination of Shape of Canceller 1

Figure 27:
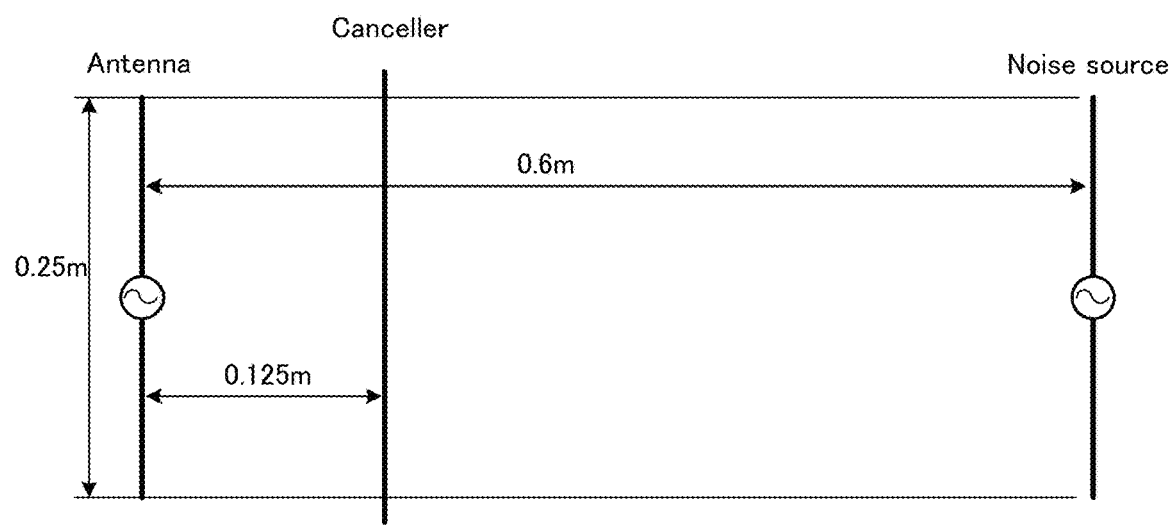
FIG. 27 is a model diagram of Test 8 according to a working example of the present invention.
Figure 28:
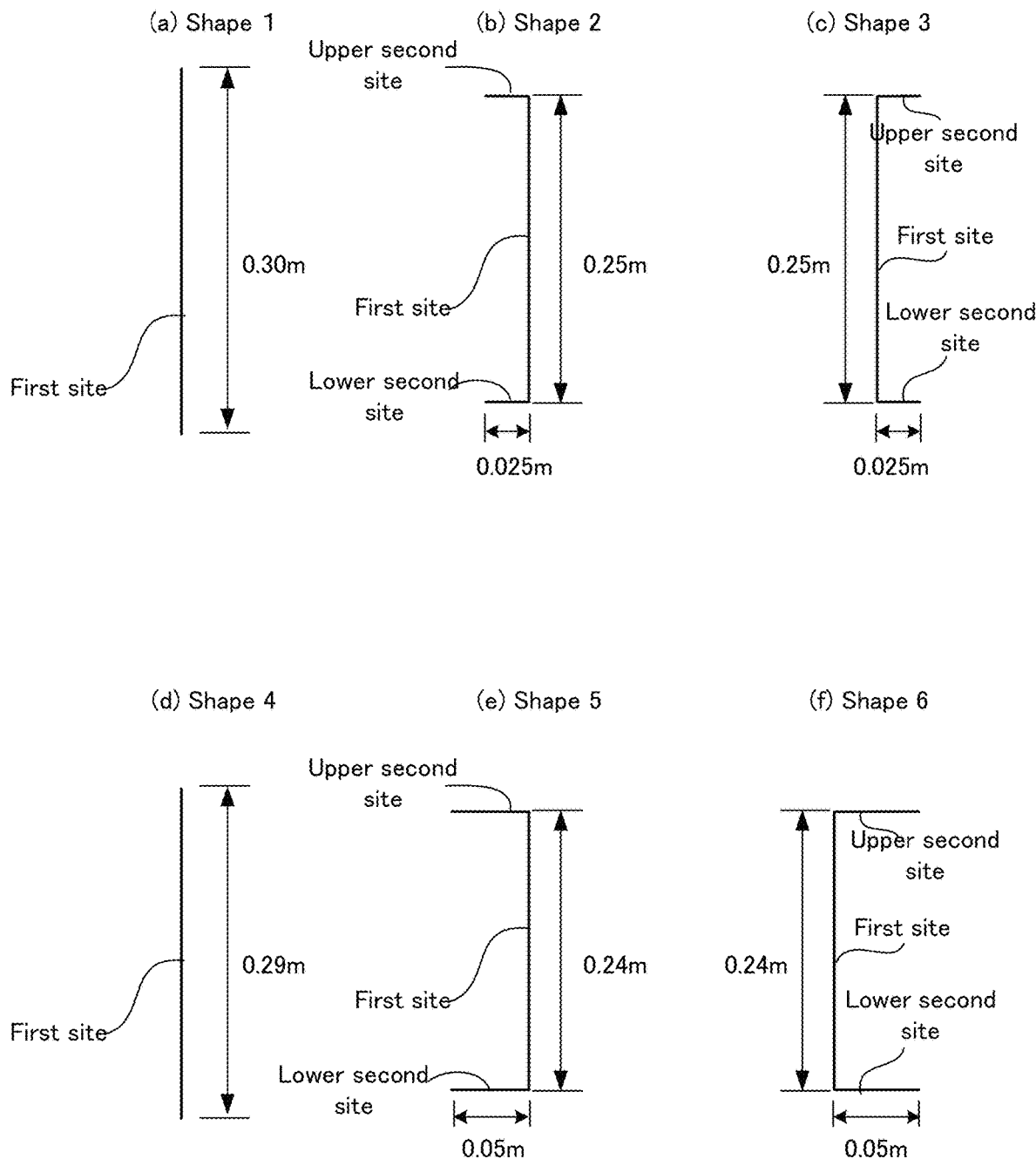
FIG. 28 is a diagram showing Shapes 1 to 6 of cancellers in Test 8.

As shown in FIG. 27, a test model was produced in Test 8. That is, similarly to Test 4 above, an antenna, a canceller, and a noise source were disposed in the stated order, and electromagnetic waves of 600 MHz (the wavelength $\lambda=0.5$ m) were transmitted from the noise source. The length of the antenna and the length of the noise source were set to 0.25 m ($=\lambda/2$). However, as shown in FIG. 28, six types of cancellers with different shapes were prepared.

Shape 1: the canceller was formed into a linear shape extending in parallel to the antenna and the noise source, and the length thereof was 0.30 m.

Shape 2: the canceller had a linear first site extending in parallel to the antenna and the noise source, and an upper second site and a lower second site that perpendicularly extend from both ends of the first site toward the antenna. The length of the first site was 0.25 m, and the length of the upper second site and the length of the lower second site were 0.025 m. Thus, the total length was 0.30 m.

Shape 3: the canceller had a linear first site extending in parallel to the antenna and the noise source, and an upper second site and a lower second site that perpendicularly extend from both ends of the first site toward the noise source. The length of the first site was 0.25 m, and the length of the upper second site and the length of the lower second site were 0.025 m. Thus, the total length was 0.30 m.

Shape 4: the canceller was formed into a linear shape extending in parallel to the antenna and the noise source, and the length thereof was 0.29 m.

Shape 5: the canceller was formed into a shape similar to Shape 2, except that the length of the first site was 0.24 m. The total length was 0.29 m.

Shape 6: the canceller was formed into a shape similar to Shape 3, except that the length of the first site was 0.24 m. The total length was 0.29 m.

Figure 29:
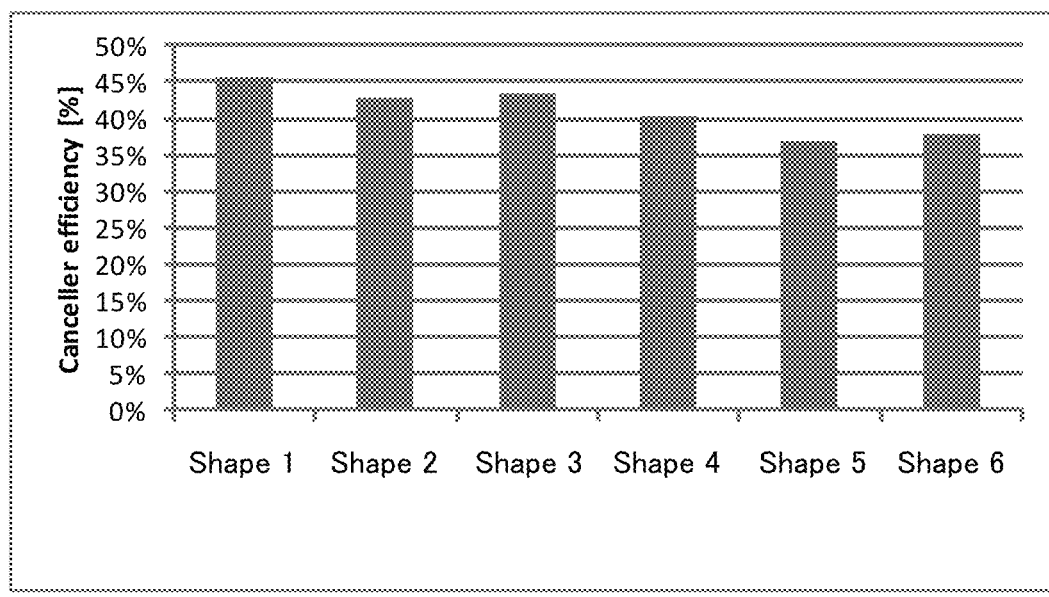
FIG. 29 is a diagram showing the receiving sensitivities when the cancellers with Shapes 1 to 6 were used in Test 8.

The results are shown in FIG. 29. As shown in FIG. 29, the cancellers according to Shapes 4 to 6 with a short total length had a stronger noise reduction effect. This coincides with the results of Test 4 above. Also, the cancellers with a U shape had a stronger noise reduction effect. It was found that, among those cancellers, the canceller whose second site faces the antenna had a stronger noise reduction effect.

F. Examination of Shape of Canceller 2

Figure 30:
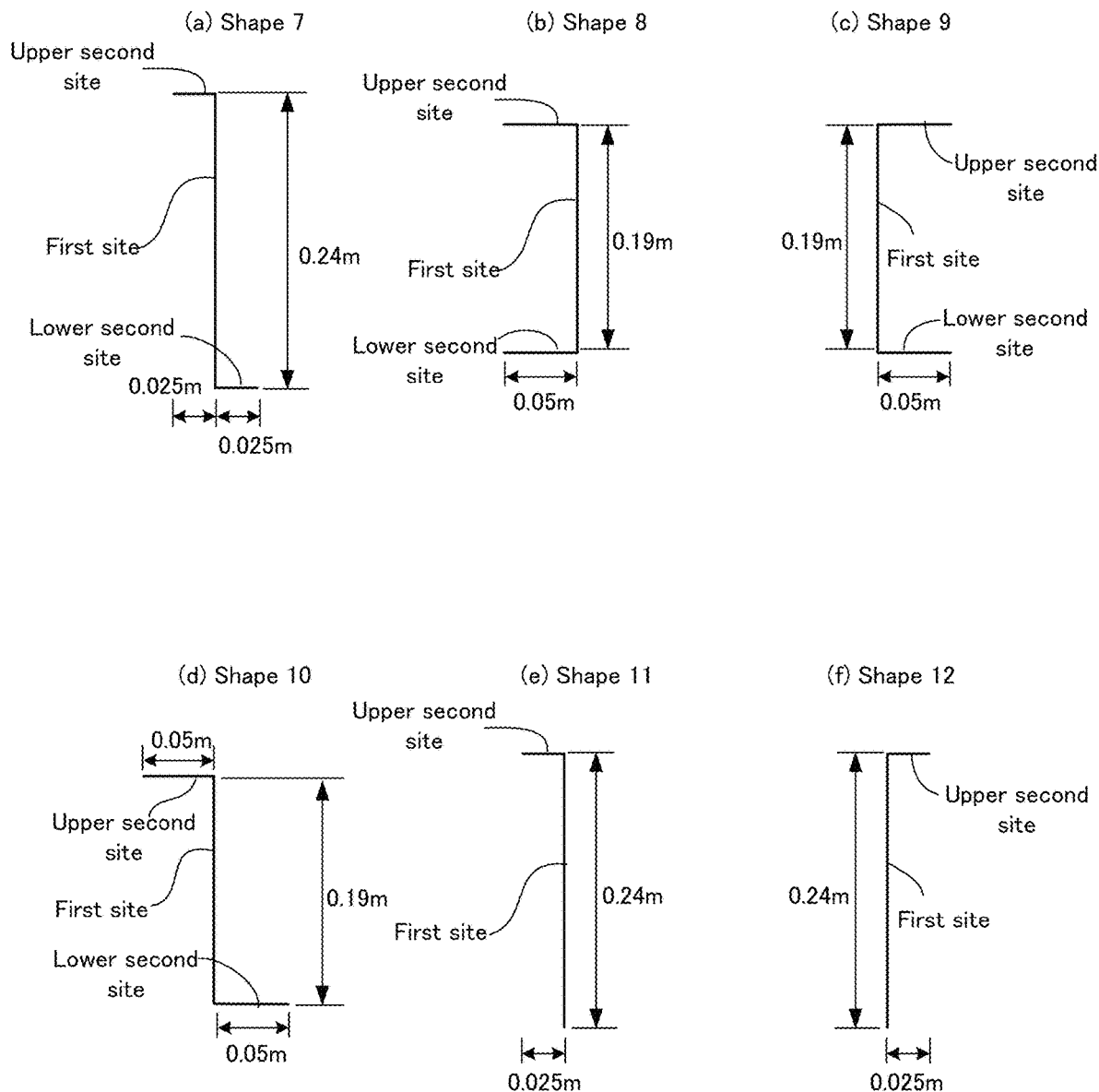
FIG. 30 is a diagram showing Shapes 7 to 12 of cancellers in Test 9.

Similarly to Test 8, an antenna, a canceller, and a noise source were disposed in the stated order, and electromagnetic waves of 600 MHz (the wavelength $\lambda=0.5$ m) were transmitted from the noise source in Test 9. The length of the antenna and the length of the noise source were set to 0.25 m ($=\lambda/2$). Also, in addition to the shape of Test 5, as shown in FIG. 30, six types of cancellers with different shapes were further prepared.

Shape 7: the canceller had a linear first site extending in parallel to the antenna and the noise source, an upper second site that perpendicularly extends from an upper end of the first site toward the antenna, and a lower second site that perpendicularly extends from a lower end of the first site toward the noise source. The length of the first site was 0.24 m, and the length of the upper second site and the length of the lower second site were 0.025 m. Thus, the total length was 0.30 m.

Shape 8: the canceller was formed into a shape similar to Shape 2, except that the length of the first site was 0.19 m, and the length of the upper second site and the length of the lower second site were 0.05 m. The total length was 0.29 m.

Shape 9: the canceller was formed into a shape similar to Shape 3, except that the length of the first site was 0.19 m, and the length of the upper second site and the length of the lower second site were 0.05 m. The total length was 0.29 m.

Shape 10: the canceller was formed into a shape similar to Shape 7, except that the length of the first site was 0.19 m, and the length of the upper second site and the length of the lower second site were 0.05 m. The total length was 0.29 m.

Shape 11: the canceller had an L shape having a linear first site extending in parallel to the antenna and the noise source, and an upper second site that perpendicularly extends from an upper end of the first site toward the antenna. The length of the first site was 0.24 m, and the length of the upper second site was 0.05 m. Thus, the total length was 0.29 m.

Shape 12: the canceller had an L shape having a linear first site extending in parallel to the antenna and the noise source, and an upper second site that perpendicularly extends from an upper end of the first site toward the noise source. The length of the first site was 0.24 m, and the length of the upper second site was 0.05 m. Thus, the total length was 0.29 m.

Figure 31:
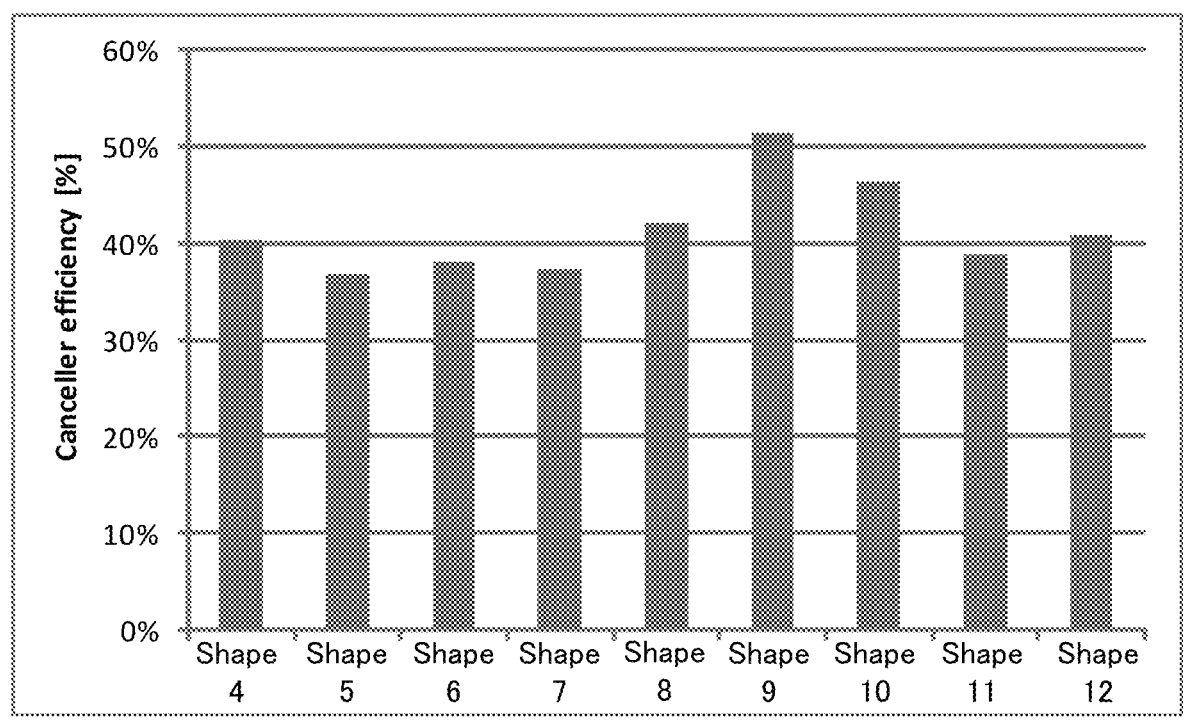
FIG. 31 is a diagram showing the receiving sensitivities when the cancellers with Shapes 7 to 12 were used in Test 9.

The results are shown in FIG. 31. The results of Shapes 4, 5, and 6 are also shown in FIG. 31, for comparison. The noise reduction effect of the canceller according to Shape 7 in which the orientation of the upper second site and the orientation of the lower second site are different from each other was not much different from that of the canceller according to Shapes 5 and 6. Also, the cancellers according to Shapes 8 to 10 with a short first site had a weaker noise reduction effect than the cancellers with other shapes. Among those cancellers, Shape 8 in which the upper second site and the lower second site face the antenna had a stronger noise reduction effect than Shape 9. Shape 10 in which the orientation of the upper second site and the orientation of the lower second site are different from each other had a weaker noise reduction effect than Shape 8 and a stronger noise reduction effect than Shape 9. Also, although Shapes 11 and 12 with an L shape had a weaker noise reduction effect than Shapes 5 to 7, Shapes 11 and 12 had a stronger noise reduction effect than Shapes 8 to 10.

Thus, it was found that if a canceller is bent, the canceller is preferably bent to face an antenna. Also, it was found that even though cancellers have the same total length, the length of the first site is preferably long.

G. Examination of Shape of Canceller 3

Figure 32:
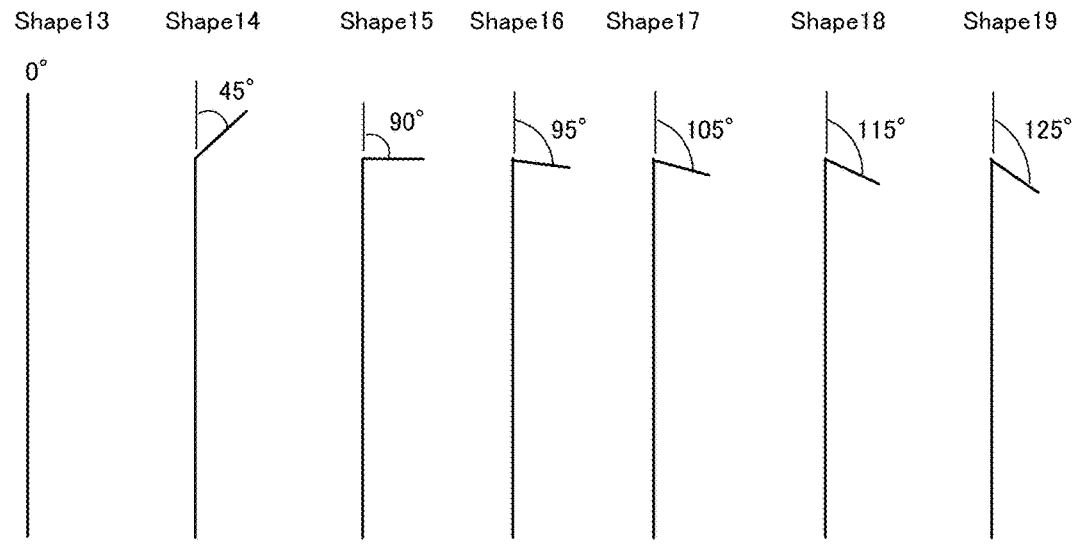
FIG. 32 is a diagram showing Shapes 13 to 27 of a canceller in Test 10.
Figure 32:
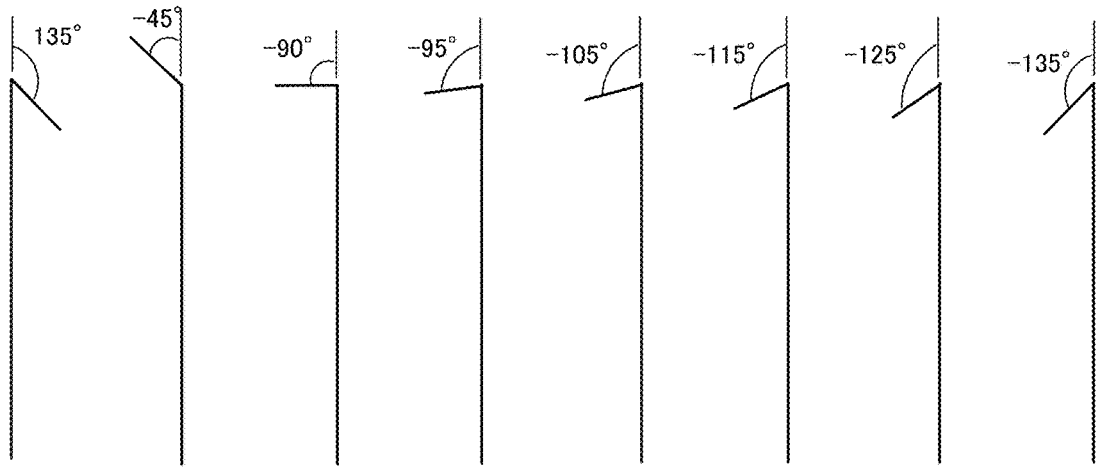

Similarly to Test 8 above, an antenna, a canceller, and a noise source were disposed, and electromagnetic waves of 600 MHz (the wavelength λ=0.5 m) were transmitted from the noise source in Test 10. The length of the antenna and the length of the noise source were set to 0.25 m (=λ/2). However, as shown in FIG. 32, fifteen types of cancellers with different shapes were prepared.

Shapes 13 to 27 each had a linear first site extending in parallel to the antenna and the noise source, and a second site that further extends from an upper end of the first site, and angles between the first site and the second site were different from each other. That is, in Shapes 13 to 19, the angles between the first site and the second site were 0 degrees, 45 degrees, 90 degrees, 95 degrees, 105 degrees, 115 degrees, 125 degrees, 135 degrees, −45 degrees, −90 degrees, −95 degrees, −105 degrees, −115 degrees, −125 degrees, and −135 degrees. The angle herein has "+" on the noise source side and "−" on the antenna side. Also, the length of the first site was set to 0.24 m, the length of the second site was set to 0.05 m, and the total length was set to 0.29 m.

Figure 33:
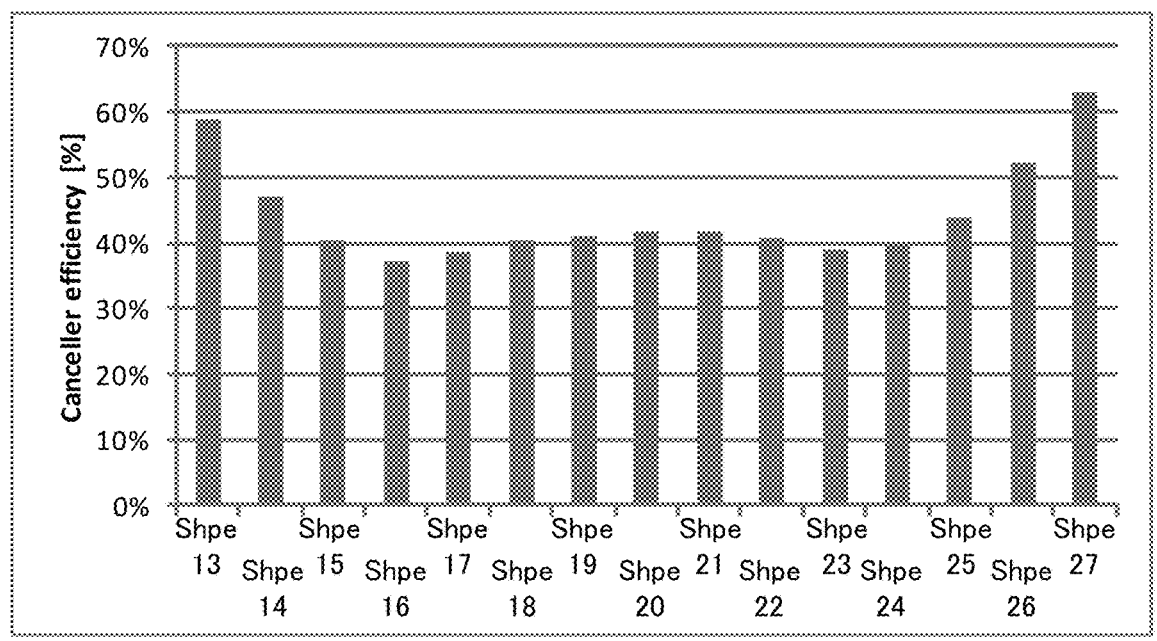
FIG. 33 is a diagram showing the receiving sensitivities when the cancellers with Shapes 13 to 27 were used in Test 10.

The results are shown in FIG. 33. As shown in FIG. 33, it was found that if the angle between the first site and the second site is larger than 115 degrees or is smaller than −115 degrees, the noise reduction effect deteriorates. However, noise is reduced compared to the case where no canceller is provided.

H. Examination of Position of Canceller 3

Figure 34:
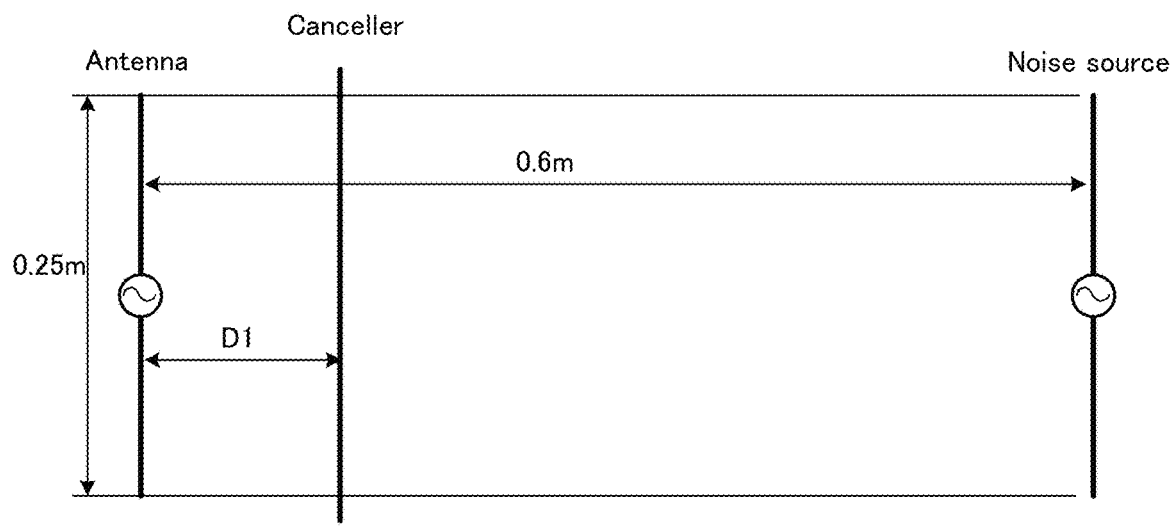
FIG. 34 is a model diagram of Test 11 according to a working example of the present invention.

As shown in FIG. 34, a test model was produced in Test 11. That is, similarly to Test 1, an antenna, a canceller, and a noise source were disposed. However, the cancellers according to Shapes 4, 5, 7, and 11 above were used as the cancellers, a distance D1 between the antenna and the canceller was changed, and the induced current generated in the antenna was calculated. The results are shown in FIG. 35.

Figure 35:
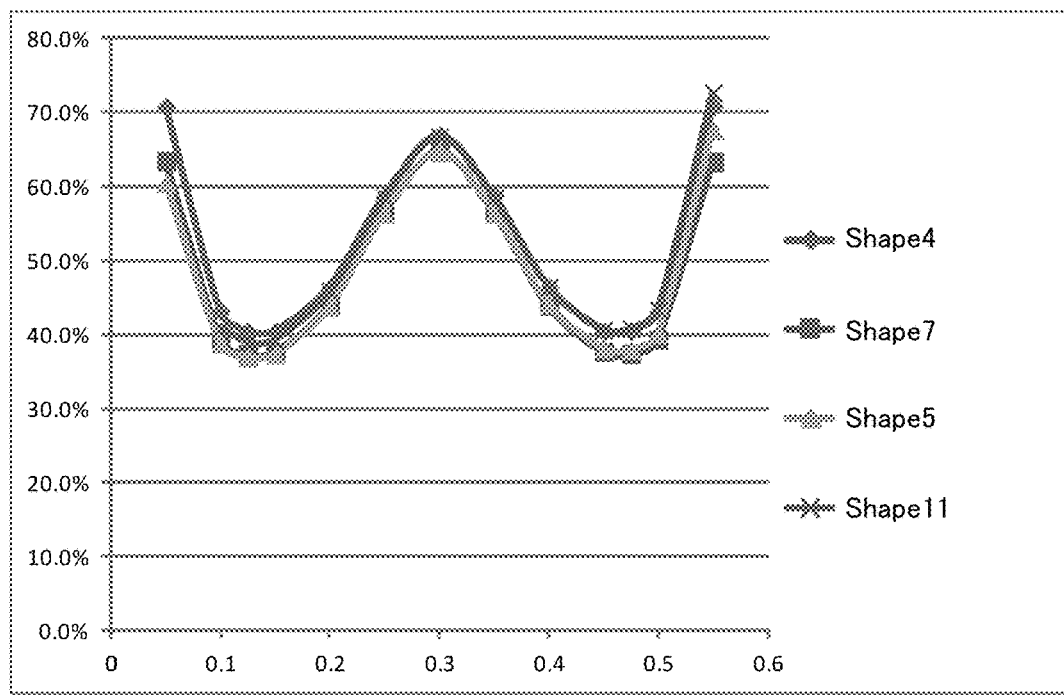
FIG. 35 is a graph showing a relationship between frequency and receiving sensitivity at each position of a canceller in Test 11.

As shown in FIG. 35, even if the shape of the canceller changed, the induced current generated in the antenna was substantially the same. That is, results that were similar to those of Test 1 were obtained, and it was found that the noise reduction effect was substantially the same.

I. Examination of Angle of Canceller

Figure 36:
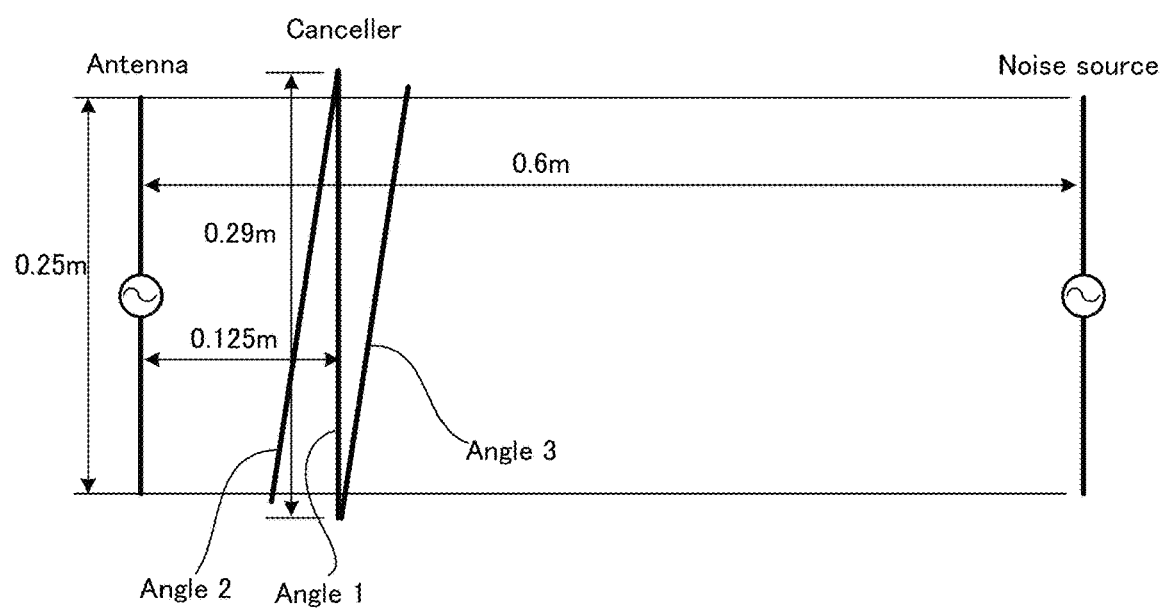
FIG. 36 is a model diagram of Test 12 according to a working example of the present invention.

As shown in FIG. 36, a test model was produced in Test 12. That is, similarly to Test 4, an antenna, a canceller, and a noise source were disposed. Herein, although a canceller with a length of 0.29 m was used, the angle was changed to three types as follows.

Angle 1: a canceller that is parallel to the antenna and the noise source, similarly to Test 4

Figure 37:
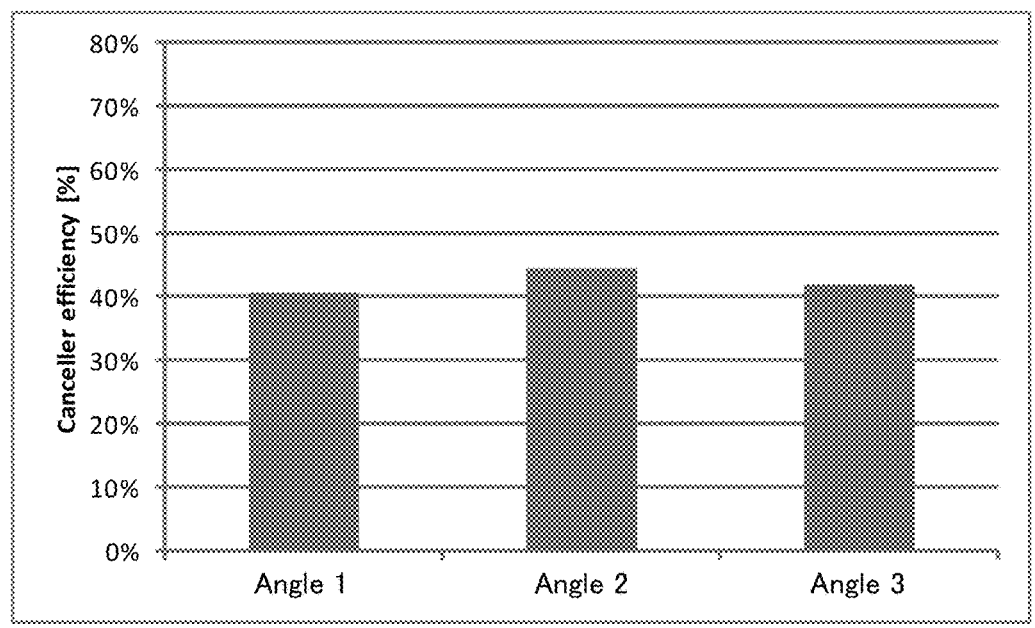
FIG. 37 is a diagram showing the receiving sensitivities when cancellers with Angles 1 to 3 were used in Test 12.

Angle 2: a canceller that extends downward from the same position as the upper end of the canceller according to Angle 1 and is inclined 10 degrees Angle 3: a canceller that extends upward from the same position as the lower end of the canceller according to Angle 1 and is inclined 10 degrees The results are shown in FIG. 37. As shown in FIG. 37, if the canceller is inclined at Angles 2 and 3, the noise reduction effect was slightly weaker than that of the canceller with Angle 1 that was not inclined, but all cancellers had substantially the same noise reduction effect.

J. Examination of Number of Cancellers

Figure 38:
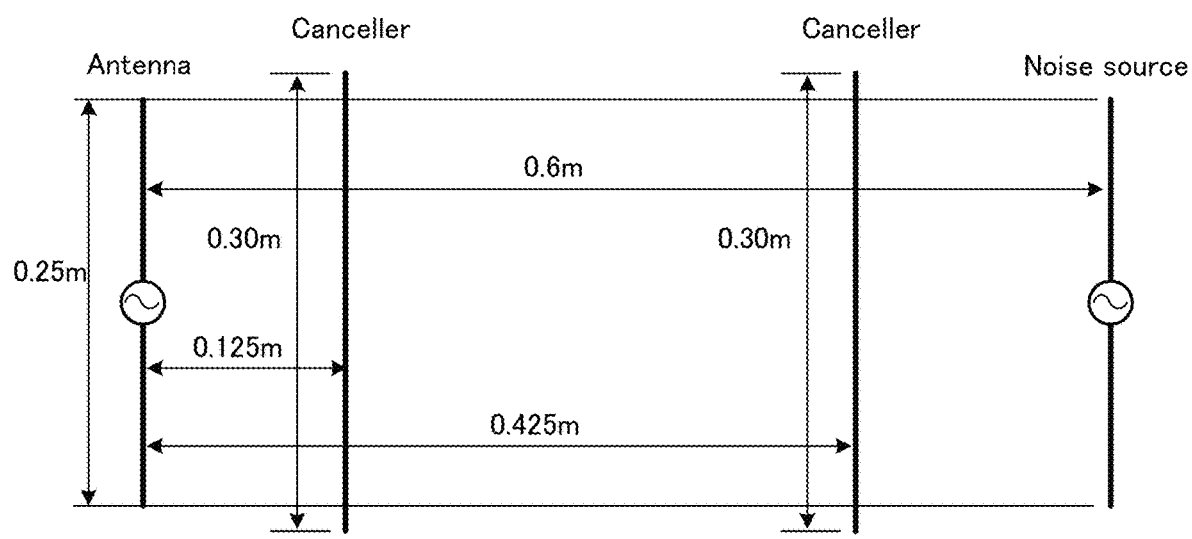
FIG. 38 is a model diagram of Test 13 according to a working example of the present invention.

As shown in FIG. 38, a test model was produced in Test 13. That is, an antenna, two cancellers (first and second cancellers), and a noise source were disposed, and electromagnetic waves of 600 MHz (the wavelength λ=0.5 m) were transmitted from the noise source. The distance between the antenna and the noise source was set to 0.6 m. Also, the distance between the antenna and the first canceller was set to 0.125 m, and the distance between the antenna and the second canceller was set to 0.475 m. The length of the antenna and the length of the noise source were set to 0.25 m (=λ/2), and the length of the two cancellers (the first and second cancellers) was set to 0.3 m.

Figure 39:
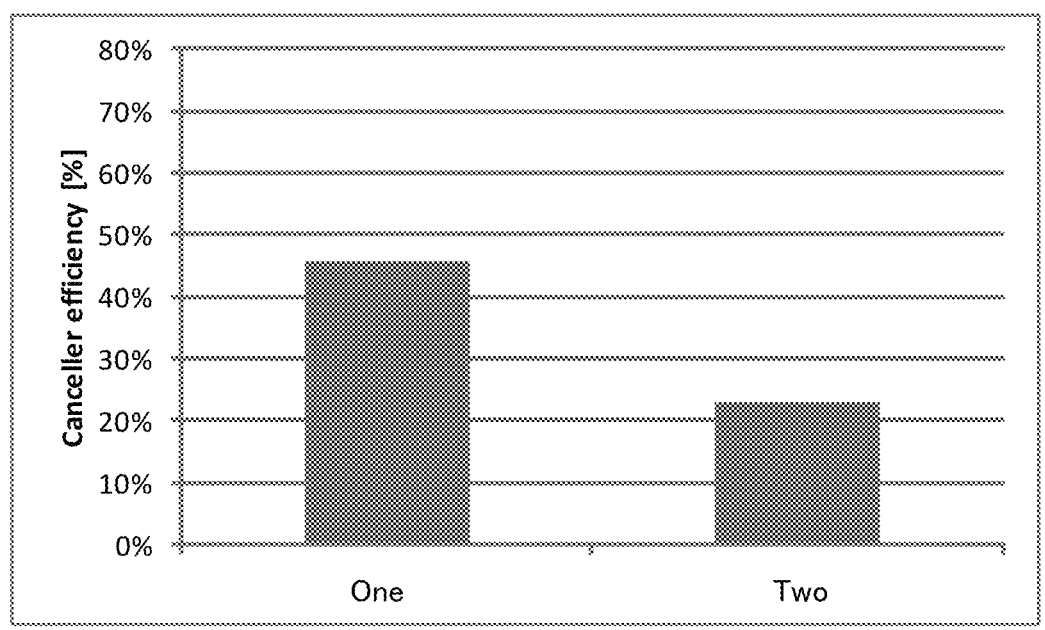
FIG. 39 is a diagram showing the receiving sensitivities for each number of cancellers in Test 13.

The results are shown in FIG. 39. As shown in FIG. 39, it was found that the noise reduction effect was improved about two-fold in the case where the two cancellers were used, compared to the case where one canceller was used. In this manner, if a plurality of cancellers are used, noise reduction can be expected in a wide range.

K. Examination of Shape of Canceller 4

In Test 14, a noise reduction effect was examined in the case where a canceller was provided with unevenness. Examination was performed with regard to cancellers with eight shapes shown in FIGS. 40(a) to 40(h). The right line in FIGS. 40(a) to 40(h) indicates the noise source, and electromagnetic waves of 600 MHz were transmitted. On the other hand, the left line indicates the antenna, and the canceller was disposed between the noise source and the antenna. A plurality of dots are depicted as a reference at intervals of 0.06 m in a region in which the canceller is disposed. Thus, the length of each canceller is understood with reference to these dots. Also, the distance between the antenna and the noise source in the horizontal direction is 0.57 m, and the length of the antenna and the length of the noise source are 0.25 m. Also, simulation that is similar to that of Test 1 above was performed. The results are as follows.

TABLE 3

Figure 40:
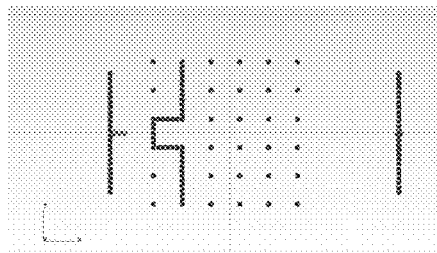
FIG. 40 is a diagram showing shapes of cancellers in Test 14.
Figure 40:
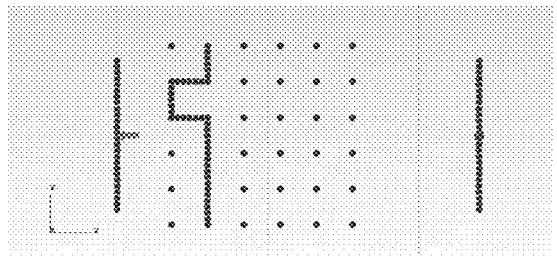
Figure 40:
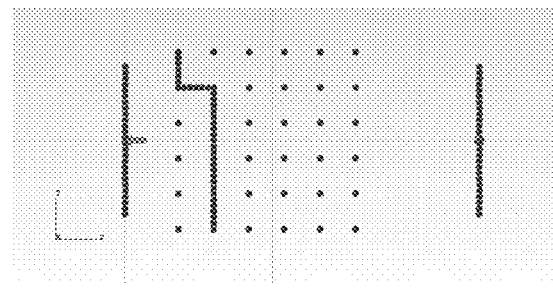
Figure 40:
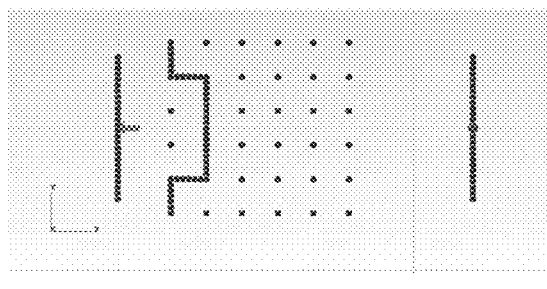
Figure 40:
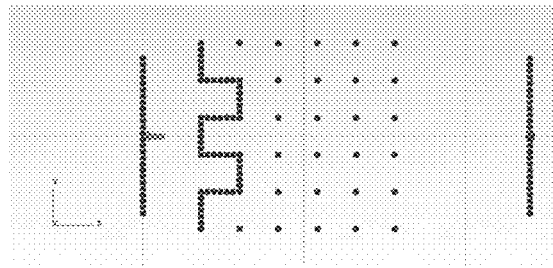
Figure 40:
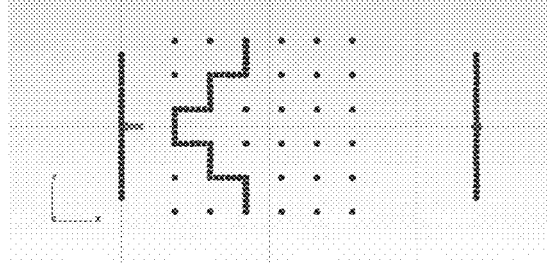
Figure 40:
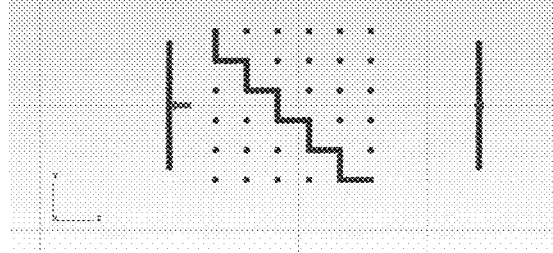
Figure 40:
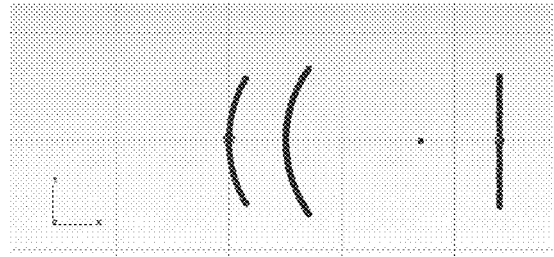

|  |  | Length | Induced Current |
|---|---|---|---|
| Shape 28 | FIG. 40(a) | 0.42 m | 19% |
| Shape 29 | FIG. 40(b) | 0.42 m | 21% |
| Shape 30 | FIG. 40(c) | 0.36 m | 32% |
| Shape 31 | FIG. 40(d) | 0.42 m | 30% |
| Shape 32 | FIG. 40(e) | 0.54 m | 37% |
| Shape 33 | FIG. 40(f) | 0.54 m | 11% |
| Shape 34 | FIG. 40(g) | 0.60 m | 30% |
| Shape 35 | FIG. 40(h) | 0.3 m (radius of curvature 0.3 m) | 43% |

For example, with Shape 28, it is understood that the induced current is 19%, and thus 81% of noise is cut, compared to the case where no canceller is provided. Comparing Shapes 28 to 35, it was found that although the cancellers with Shapes 28 and 33 in which protrusions are formed near the center of the antenna in the vertical direction had a stronger noise reduction effect, the cancellers with any shape having unevenness had a stronger noise reduction effect.

Figure 41:
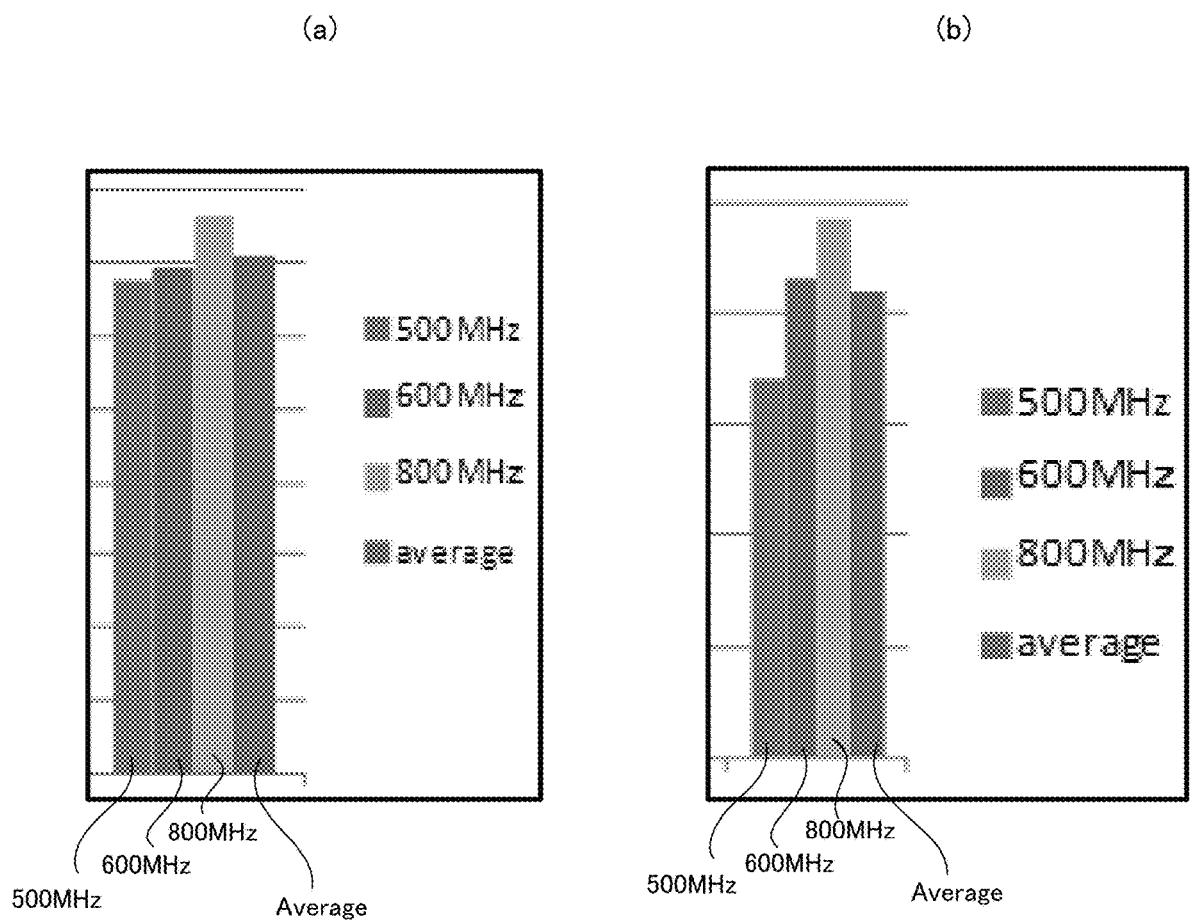
FIG. 41 is a graph showing evaluations of Shape 30 and Shape 34 of the cancellers in Test 14.

Also, with regard to Shapes 30 and 34, examination was performed with electromagnetic waves of the noise source having a frequency of 500 MHz and 600 MHz. The results are shown in FIGS. 41(*a*) and 41(*b*). FIGS. 41(*a*) and 41(*b*) show graphs showing the induced current relative to the frequencies of the noise source. As shown in FIG. 41(*a*), it was found that with both Shapes 30 and 34, the cancellers had the weakest noise reduction effect when the frequency of the noise source was 800 MHz, but did not have a significant difference, and even if the frequency changed, their noise reduction effects did not change significantly.

L. Examination of Noise Reduction Effect Through Actual Measurement 1

Figure 42:
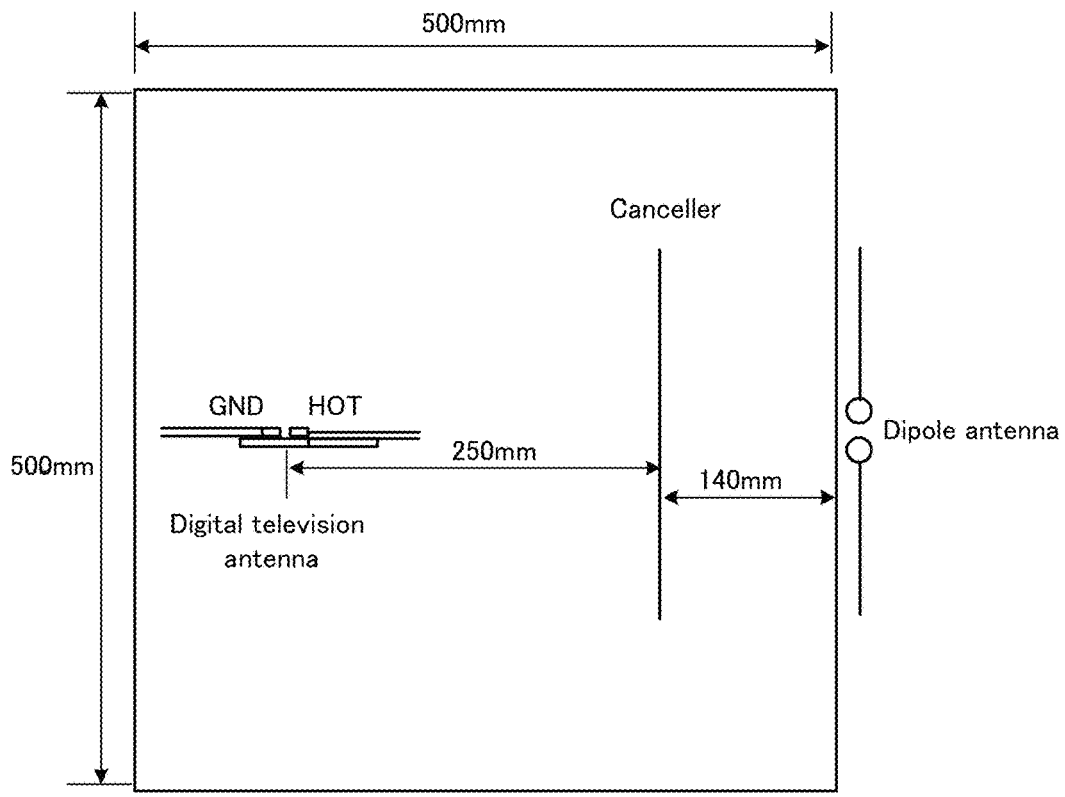
FIG. 42 is a diagram showing a model diagram in Test 15.

Although the above-described examinations were performed through simulation, the noise reduction effect of a canceller was examined through actual measurement in Test 15. A test model as shown in FIG. 42 was produced. That is, as shown in FIG. 42, a digital television antenna was disposed on a glass plate having a size of 500 mm×500 mm. Also, a canceller extending in the vertical direction was disposed at a position located 250 mm away from the center of the digital television antenna in the left-right direction to the right. Also, a dipole antenna configured to emit electromagnetic waves of 600 MHz was disposed as the noise source on the right side of the glass plate.

Also, with regard to four modes in which the cancellers had a length of 260 mm, 220 mm, and 180 mm and no canceller was provided, electromagnetic wave passing characteristics (dB) were measured with respect to frequencies. The smaller the passing characteristics are, the more noise from the dipole antenna is reduced by the canceller. The results are shown in FIG. 43.

Figure 43:
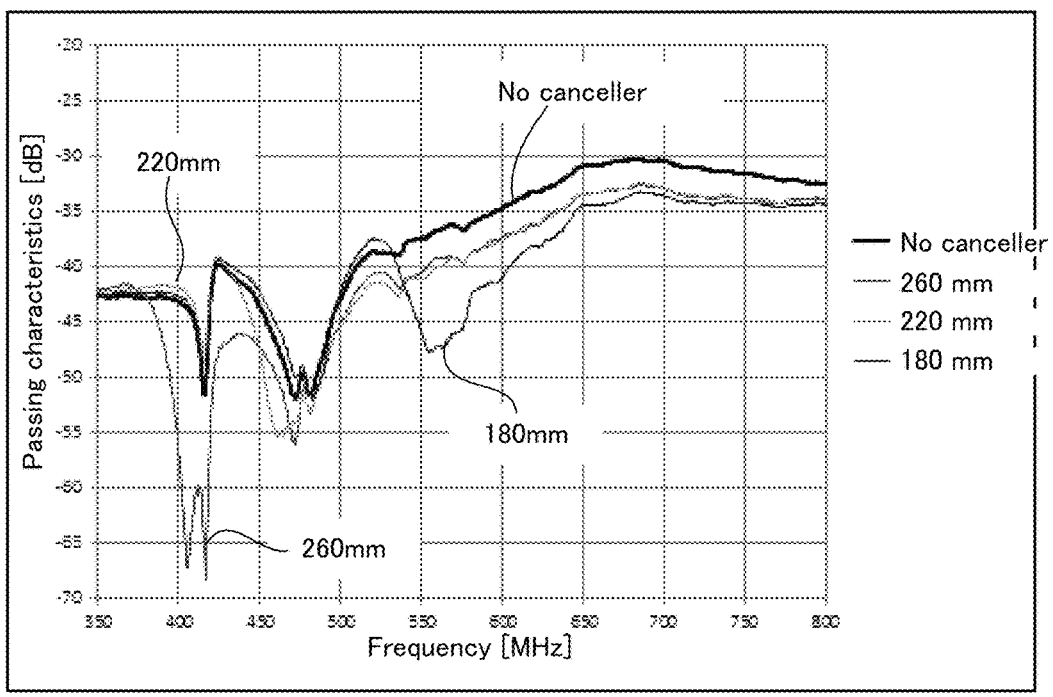
FIG. 43 is a graph showing a relationship between frequencies and passing characteristics in Test 15.

As shown in FIG. 43, the noise reduction effect was confirmed in almost all of the frequency ranges, compared to the case where no canceller was provided, regardless of the length of the canceller. Also, it was found that the longer the length of the canceller is, the stronger the noise reduction effect is in a frequency range of approximately 500 MHz or less. Also, it was found that the shorter the length of the canceller is, the stronger the noise reduction effect is in a frequency range of approximately 550 MHz or more.

M. Examination of Noise Reduction Effect Through Actual Measurement 2

Figure 44:
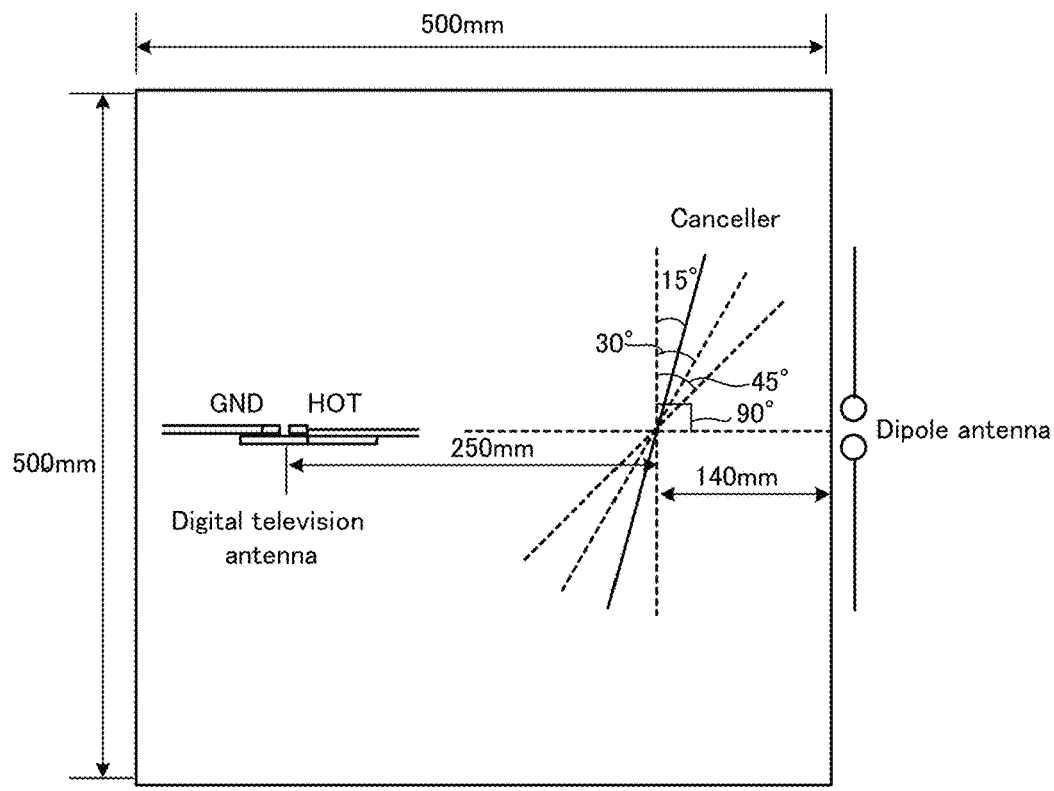
FIG. 44 is a diagram showing a model diagram in Test 16.
Figure 45:
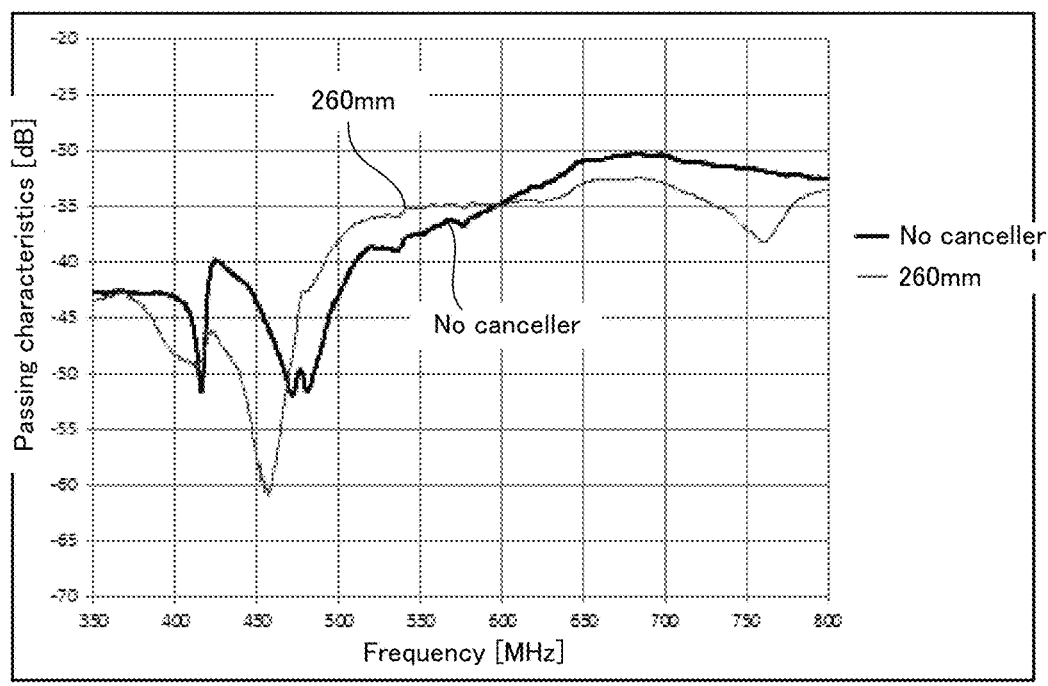
FIG. 45 is a graph showing a relationship between frequencies and passing characteristics in Test 16.

Next, as shown in FIG. 44, the canceller was inclined at an angle of 15 degrees from the model shown in FIG. 42, and the passing characteristics were measured in Test 16. The length of the canceller was set to 260 mm. The results are shown in FIG. 45. As shown in FIG. 45, the noise reduction effect was confirmed in almost all of the frequency ranges even if the canceller was inclined, compared to the case where no canceller was provided. Thus, the canceller preferably has an inclination angle of 15 degrees or less.

Figure 46:
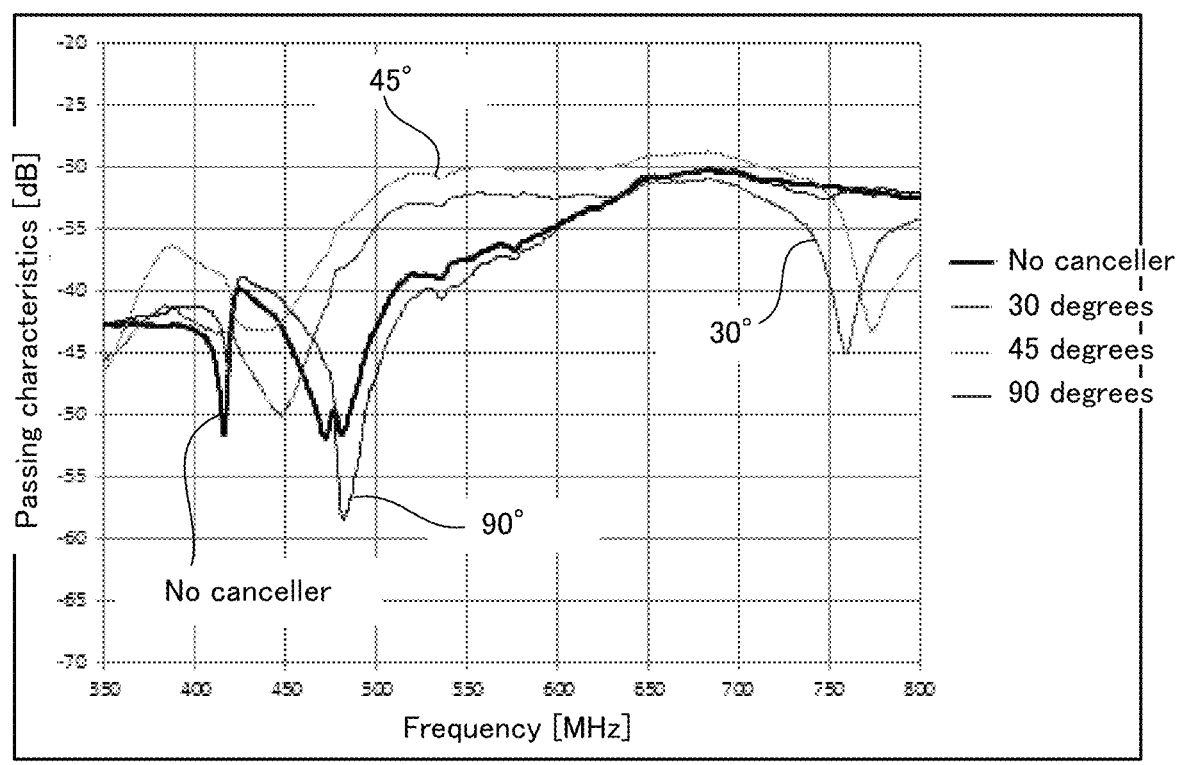
FIG. 46 is a graph showing a relationship between frequencies and passing characteristics in Test 16.

Furthermore, as shown in FIG. 44, the canceller was inclined at an angle of 30 degrees, 45 degrees, and 90 degrees from the model shown in FIG. 42, and the passing characteristics were measured. The results are shown in FIG. 46. As shown in FIG. 46, the noise reduction effect was confirmed in a frequency range of approximately 450 MHz or more in the case where the canceller was inclined at an angle of 90 degrees, compared to the case where no canceller was provided. Also, a significant noise reduction effect was confirmed in a frequency range of 700 MHz or more in the case where the canceller was inclined at an angle of 30 degrees or 45 degrees.

LIST OF REFERENCE NUMERALS

1 Glass plate
5 Sensor
6 Digital television antenna
7 Canceller

The invention claimed is:

1. A window glass near which an electronic device is to be disposed, the window glass comprising:
    a glass plate;
    an antenna that is disposed on the glass plate and is configured to receive broadcast waves; and
    at least one linear canceller that is disposed on the glass plate and is configured to inhibit noise produced from the electronic device from being received by the antenna.

2. The window glass according to claim 1,
    wherein the canceller is disposed between the antenna and the electronic device.

3. The window glass according to claim 2,
    wherein, in a case where broadcast waves received by the antenna have a wavelength of $\lambda_1$ to $\lambda_2$ and the glass plate has a wavelength shortening ratio of $\alpha$,
    a distance between the antenna and the canceller is $0.08*\alpha*2$ or more, and
    a distance between the electronic device and the canceller is $0.08*\alpha*2$ or more.

4. The window glass according to claim 2,
    wherein, in a case where broadcast waves received by the antenna have a center wavelength of $\lambda c$ and the glass plate has a wavelength shortening ratio of $\alpha$,
    a distance between the antenna and the canceller is $(0.3\pm0.05)*\alpha*\lambda c$, or
    a distance between the electronic device and the canceller is $(0.3\pm0.05)*\alpha*\lambda c$.

5. The window glass according to claim 2,
    wherein the canceller is disposed closer to the electronic device than an intermediate position between the antenna and the electronic device.

6. The window glass according to claim 1,
    wherein, in a case where broadcast waves received by the antenna have a wavelength of $\lambda_1$ to $\lambda_2$ and the glass plate has a wavelength shortening ratio of $\alpha$,
    the canceller has a total length of $\lambda_2/2*\alpha*1.06$ or more.

7. The window glass according to claim 6,
    wherein the canceller has a total length of $\lambda_2/2*\alpha*1.16$ or more.

8. The window glass according to claim 1,
    wherein the canceller is disposed on the side of the electronic device opposite to the antenna.

9. The window glass according to claim 8,
    wherein, in a case where broadcast waves received by the antenna have a wavelength of $\lambda_1$ to $\lambda_2$ and the glass plate has a wavelength shortening ratio of $\alpha$,
    a distance between the electronic device and the canceller is $\lambda_1/4*\alpha$ or less.

10. The window glass according to claim 8,
    wherein, in a case where broadcast waves received by the antenna have a wavelength of $\lambda_1$ to $\lambda_2$ and the glass plate has a wavelength shortening ratio of $\alpha$,
    the canceller has a total length of $\lambda_1/2*\alpha*0.8$ or less.

11. The window glass according to claim 1,
wherein the canceller has a linear first site and a linear second site that is joined to at least one end portion of the first site and is bent from the first site.

12. The window glass according to claim 11, wherein the second site is bent toward the antenna.

13. The window glass according to claim 11,
wherein, in a case where broadcast waves received by the antenna have a wavelength of $\lambda_1$ to $\lambda_2$ and the glass plate has a wavelength shortening ratio of $\alpha$, the first site has a length of $\lambda_2/2*\alpha$ or more.

14. The window glass according to claim 11,
wherein the second site is bent at an angle of −135 degrees to 135 degrees with respect to the first site.

15. The window glass according to claim 1, comprising a plurality of the cancellers.

16. The window glass according to claim 1, wherein the glass plate is formed using a laminated glass.

17. The window glass according to claim 1, wherein the antenna is a digital television antenna.

18. The window glass according to claim 1,
wherein an angle at which a perpendicular line that extends perpendicularly to a line connecting a center of the antenna and a center of the electronic device on the glass plate intersects with the canceller is 15 degrees or less.

* * * * *